US011007396B2

(12) United States Patent
Petrucci

(10) Patent No.: US 11,007,396 B2
(45) Date of Patent: May 18, 2021

(54) RESISTIVE EXERCISE HARNESS, RACK AND CART

(71) Applicant: Commit Equip LLC, Upland, CA (US)

(72) Inventor: Nicholas John Petrucci, Upland, CA (US)

(73) Assignee: Commit Equip LLC, Upland, CA (US)

( * ) Notice: Subject to any disclaimer, the term of this patent is extended or adjusted under 35 U.S.C. 154(b) by 136 days.

(21) Appl. No.: 16/292,782

(22) Filed: Mar. 5, 2019

(65) Prior Publication Data
US 2019/0269957 A1    Sep. 5, 2019

Related U.S. Application Data

(60) Provisional application No. 62/638,830, filed on Mar. 5, 2018.

(51) Int. Cl.
| | | |
|---|---|---|
| *A63B 21/075* | (2006.01) | |
| *A47B 81/00* | (2006.01) | |
| *A47B 47/00* | (2006.01) | |
| *B62B 1/10* | (2006.01) | |

(Continued)

(52) U.S. Cl.
CPC ............ *A63B 21/075* (2013.01); *A47B 47/00* (2013.01); *A47B 81/00* (2013.01); *A63B 21/065* (2013.01);
(Continued)

(58) Field of Classification Search
CPC . A63B 21/065; A63B 21/075; A63B 71/0036; A63B 21/0728; A63B 21/4035; A63B 2225/093; A63B 2225/09; A63B 2210/50; A63B 21/4033; A63B 21/4039; A63B 21/0004; A63B 2208/0204; A63B 71/023; A47B 81/00; A47B 47/00; A47B 47/027; B62B 1/10; B62B 1/262; B62B 2202/40; B62B 1/14; B62B 1/26; A47F 5/13; A47F 5/01; A47F 5/101
See application file for complete search history.

(56) References Cited

U.S. PATENT DOCUMENTS

| | | |
|---|---|---|
| 3,370,850 A | 2/1968 | Moore |
| 4,477,074 A | 10/1984 | Bushnell |
| (Continued) | | |

OTHER PUBLICATIONS

International Search Report and Written Opinion for PCT/US2019/020764 dated May 10, 2019 in 11 pages.

*Primary Examiner* — Nyca T Nguyen
*Assistant Examiner* — Andrew M Kobylarz
(74) *Attorney, Agent, or Firm* — Knobbe, Martens, Olson & Bear LLP

(57) ABSTRACT

The present disclosure relates to a resistive exercise harness, a rack for use with the harness, and a cart for transporting one or more of the harness, the rack, or weights. The resistive exercise harness can be used to perform various functional movements/exercises and simulate loaded carries/movements relevant to certain occupations/sports/recreations. The resistive exercise harness can promote efficient biomechanics and decrease mechanical stresses on a user's knees and/or lower back relative to other resistive exercises such as a barbell squat. The rack can be assembled in a variety of indoor/outdoor environments for harness usage and disassembled for convenient storage and/or transportation. The cart can interface with the harness and disassembled rack for convenient storage and/or transportation in a variety of indoor/outdoor environments.

17 Claims, 22 Drawing Sheets

(51) Int. Cl.
  *B62B 1/26* (2006.01)
  *A63B 71/00* (2006.01)
  *A63B 21/072* (2006.01)
  *A63B 21/00* (2006.01)
  *A63B 21/065* (2006.01)

(52) U.S. Cl.
  CPC ...... *A63B 21/0728* (2013.01); *A63B 21/4035* (2015.10); *A63B 71/0036* (2013.01); *B62B 1/10* (2013.01); *B62B 1/262* (2013.01); *A63B 2210/50* (2013.01); *A63B 2225/09* (2013.01); *A63B 2225/093* (2013.01); *B62B 2202/40* (2013.01); *B62B 2203/60* (2013.01)

(56) References Cited

U.S. PATENT DOCUMENTS

| | | |
|---|---|---|
| 4,865,314 A | 9/1989 | Carter, Jr. |
| 4,944,509 A | 7/1990 | Snider |
| 4,986,536 A * | 1/1991 | Zane ............... A63B 21/4005 224/266 |
| 5,167,600 A * | 12/1992 | Baird ............... A63B 21/068 272/93 |
| 5,211,615 A | 5/1993 | Sides |
| 5,846,169 A * | 12/1998 | Tscheschlog ......... A63B 21/06 482/93 |
| 5,957,818 A * | 9/1999 | Betournay ........... A63B 21/065 482/105 |
| 6,652,431 B1 | 11/2003 | Mattox |
| 6,675,391 B2 | 1/2004 | Morrison |
| 7,326,154 B2 | 2/2008 | Foley |
| 9,186,538 B1 | 11/2015 | Seen et al. |
| 9,415,255 B2 | 8/2016 | McClellan |
| D797,868 S | 9/2017 | Thomas |
| 2004/0097353 A1 | 5/2004 | Mencis et al. |
| 2006/0100075 A1 | 5/2006 | Harsh |
| 2008/0182735 A1 | 7/2008 | Thomas |
| 2012/0202658 A1 | 8/2012 | Menefee, Sr. |
| 2017/0189736 A1 * | 7/2017 | Martin ............ A63B 21/4029 |

* cited by examiner

RESISTIVE EXERCISE HARNESS, RACK AND CART

INCORPORATION BY REFERENCE TO ANY PRIORITY APPLICATIONS

This application claims the benefit under 35 U.S.C. § 119(e) as a non-provisional application of U.S. Prov. Appl. No. 62/638,830, filed on Mar. 5, 2018, which is hereby incorporated by reference in its entirety. Any and all applications for which a foreign or domestic priority claim is identified in the Application Data Sheet as filed with the present application are hereby incorporated by reference under 37 CFR § 1.57.

FIELD

The present disclosure relates to a resistive exercise harness, a rack for use with the harness, and a cart for transporting one or more of the harness, the rack, or weights.

BACKGROUND

Certain exercise activities/movements and occupational/sport/recreational movements require one to overcome a resistive load, such as lifting, carrying, pushing or pulling an object. One may be at risk for discomfort and/or injury if mobility, strength and stability motor control are deficient, and biomechanics are inefficient while performing these activities or movements.

Existing similar exercise/strengthening devices/equipment are unable to provide the combination of comfortably increasing resistive loads, promoting efficient biomechanics to decrease mechanical stresses and/or incidence of injury on certain areas of the body (such as the knees and/or lower back), and diversity to perform various functional movements/exercises or simulate occupational/sport/recreational movements in a variety of environmental settings with easy portability. Other devices that have shoulder straps may create increased pressure against the front of the shoulder region under moderate to heavy loads causing discomfort and/or injury to muscle, nerves, and/or blood supply/circulation. Other resistive exercises, such as barbell squats, may potentially increase mechanical stresses and/or incidence of injury due to increased torque and/or axial loads on the spine and increased load/demand on structures of the knees and lower back.

SUMMARY

The systems, methods and devices described herein have innovative aspects, no single one of which is indispensable or solely responsible for their desirable attributes. Without limiting the scope of the claims, some of the advantageous features will now be summarized.

In some embodiments, a resistive exercise harness system can include an exercise harness. The exercise harness can include an upper portion and a lower portion. The upper portion can include shoulder supports, forwardly-extending grip handles, and upper back supports. The lower portion can include a mid/low back support and weight mounts. The resistive exercise harness system can include a rack. The rack can be assembled and disassembled. The exercise harness can mount and unmount onto the rack. The resistive exercise harness can include a cart. The cart can transport the resistive exercise harness and disassembled rack. The cart can include a harness support, wheels, and connecting supports. The harness support can support the harness. The connecting supports can interface with the disassembled rack.

In some embodiments, the rack can have an upper cross support. The exercise harness can mount and unmount onto the upper cross support. The upper cross support can be adjustable to different positions to accommodate a user's preferences and size.

In some embodiments, the rack can include bottom supports, upright supports, and an upper cross support. The bottom supports, upright supports, and upper cross support can be coupled together to form the rack.

In some embodiments, the upright supports can have weight storage mounts that are configured to interface with weights that are not in use.

In some embodiments, the lower portion of the resistive exercise harness is adjustable relative to the upper portion such that the mid/low back support can be adjusted to various positions to accommodate a user's preferences and/or sizes.

In some embodiments, the cart can have a plurality of weight storage mounts that are configured to interface with weights.

In some embodiments, the resistive exercise harness system can be stored within an area having a height of at least 16 inches, width of at least 24 inches, and length of at least 64 inches, such that the system can be conveniently stored and/or transported in standard SUVs, pickup trucks, and/or select car trunks.

In some embodiments, the resistive exercise harness can have an upper portion and lower portion. The upper portion can have shoulder supports that can engage with shoulders of a user. The shoulder supports can include pads. The upper portion can include forwardly-extending grip handles coupled to the shoulder supports. The grip handles can be grasped by the user. The upper portion can have upper back supports that can engage with an upper back of the user. The upper back supports can have pads. The upper portion can have storage/racking hooks that can interface with at least a cross support bar of a weight rack for mounting and unmounting the harness. The upper portion can have transporting/spotting grips that can be used for transporting the harness and/or spotting a user during exercises. The lower portion can have a mid/low back support that can engage with a mid or lower back of the user. The mid/low back support can have at least one pad. The lower portion can have mounts that extend outwardly and rearwardly from the lower portion. The mounts can interface with weights.

In some embodiments, the harness can have an upper portion and lower portion. The upper portion can have shoulder supports that can engage with shoulders of a user. The upper portion can have forwardly-extending grip handles that can be grasped by the user. The upper portion can have upper back supports that can engage with an upper back of the user. The lower portion can have a mid/low back support that can engage with a mid or lower back of the user. The lower portion can have mounts that can interface with weights.

In some embodiments, the lower portion is adjustable relative to the upper portion such that the mid/low back support can be adjusted to various positions to accommodate user's preferences and/or sizes.

In some embodiments, the upper portion comprises a locking hole and the lower portion that can include a plurality of adjustment holes. The plurality of adjustment holes can be selectively aligned with the locking hole to place the lower portion in a desired position relative to the upper portion. The locking mechanism can interface with the locking hole and adjustment holes to fix the lower portion to the upper portion in the desired position.

In some embodiments, the upper portion and lower portion form an inverted L-shape when viewed from the side.

In some embodiments, the mounts extend outwardly and rearwardly from the lower portion of the harness.

In some embodiments, the mounts extend rearwardly from the mid/low back support at an angle between 30-60 degrees.

In some embodiments, the upper portion can include a plurality of storage/racking hooks that extend rearwardly from the upper portion. The plurality of storage/racking hooks can interface with at least a cross support bar of a weight rack for mounting and unmounting the harness.

In some embodiments, the upper portion can include a plurality of transporting/spotting grips that can be used for transporting the harness and/or spotting a user during exercises.

In some embodiments, the shoulder supports, upper back supports, and/or mid/low back supports can have pads. The pads can provide cushioning.

In some embodiments, the grip handles can have distal ends that have an enlarged size relative to the grip handles that can help prevent a user's hand from slipping off the grip handles.

In some embodiments, the distal ends of the grip handles are spheres.

In some embodiments, the shoulder supports, upper back supports, and mid/low back support are made of square tubing.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1A:
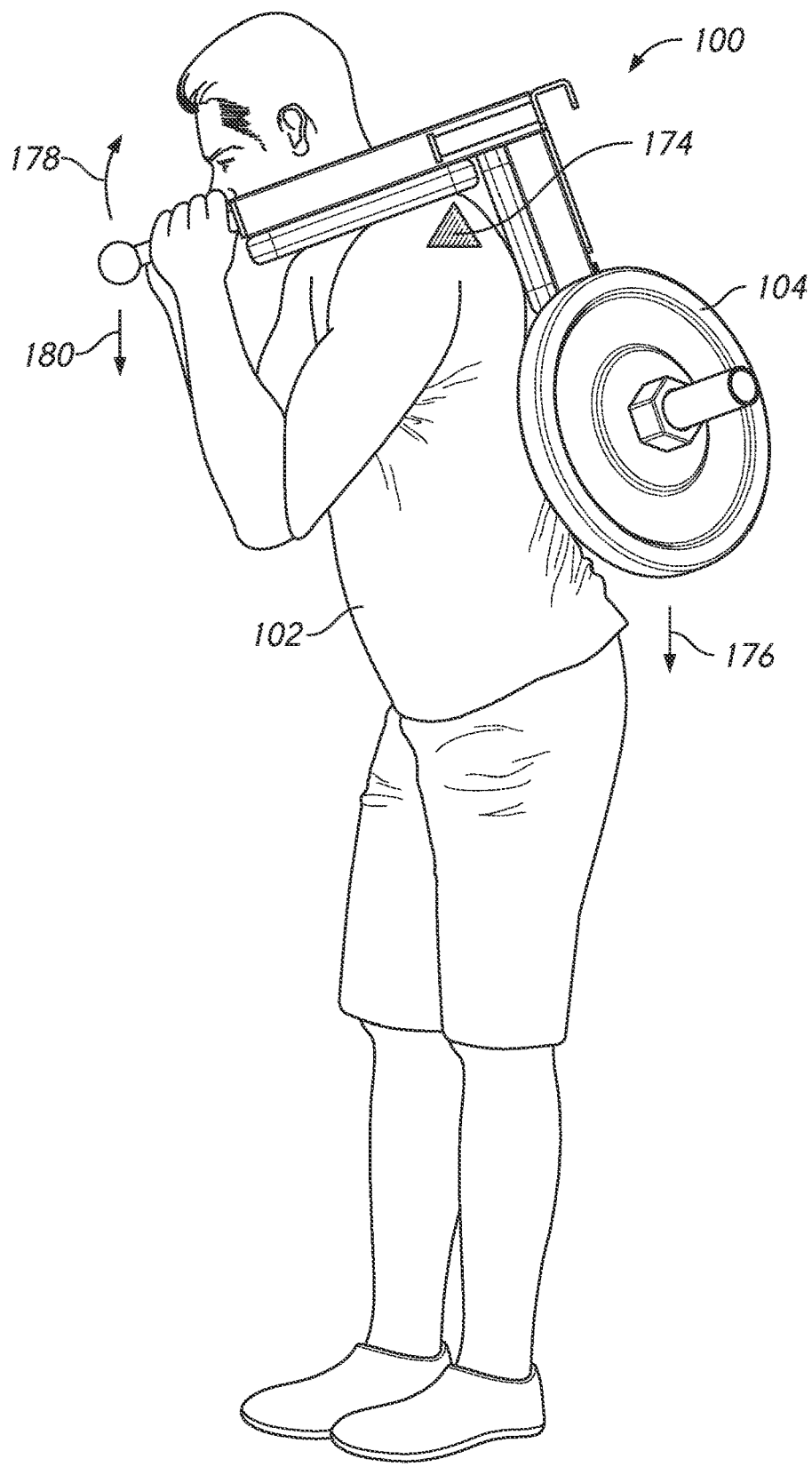
FIG. 1A is an example resistive exercise harness in use with weights.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Certain embodiments of the present resistive exercise harness assembly facilitate user exercises/movements that aid in increasing lower/upper body, hip, and trunk/core muscle strength and stability motor control while promoting efficient biomechanics that can decrease mechanical stresses on the knees and lower back. In some configurations, the resistive exercise harness assembly allows one to evenly increase load poundage while promoting a hip strategy/bias and activation of core musculature, which can decreases mechanical stresses on the knees and lower back. In at least some configurations, the harness offers more comfort than other products with increased surface area contact that disperses pressure through cushioned pads more evenly than existing devices. In some embodiments, the resistive exercise harness allows simulation of a heavy loaded sack/pack while eliminating the compressive forces that a strap of a heavy sack/pack can exert on the front shoulder region that can restrict circulation and/or put pressure on nerves. This can reduce and/or eliminate the potential of numbness, discomfort, and/or tingling in the upper extremities.

In some configurations, the resistive exercise harness assembly improves on other devices by offering the user the ability to transport and use in a variety of indoor/outdoor environments, comfortably increase resistive loads for lower/upper body, hip and trunk/core strength/coordination, improve double limb and/or single limb stability motor control, and perform various functional movements and/or simulate certain occupational/sport/recreational loaded carries/movements. In at least some configurations, the harness can promote efficient biomechanics and decrease mechanical stresses and/or the incidence of injury, common to the knees and lower back during resistive exercises such as barbell squats.

Further, in at least some embodiments, a transporting cart is provided to provide for easy handling, mounting, transportation and usage of the harness in many diverse settings, such as indoor/outdoor fields, stairways, beaches, weight rooms, trails, hills, stadiums, residential use, etc. In some configurations, the harness can be supported by its own custom portable rack. In some configurations, the harness can mount to any standard Olympic straight bar/barbell supported by a standard durable power rack or weight lifting stand.

Harness

Figure 1B:
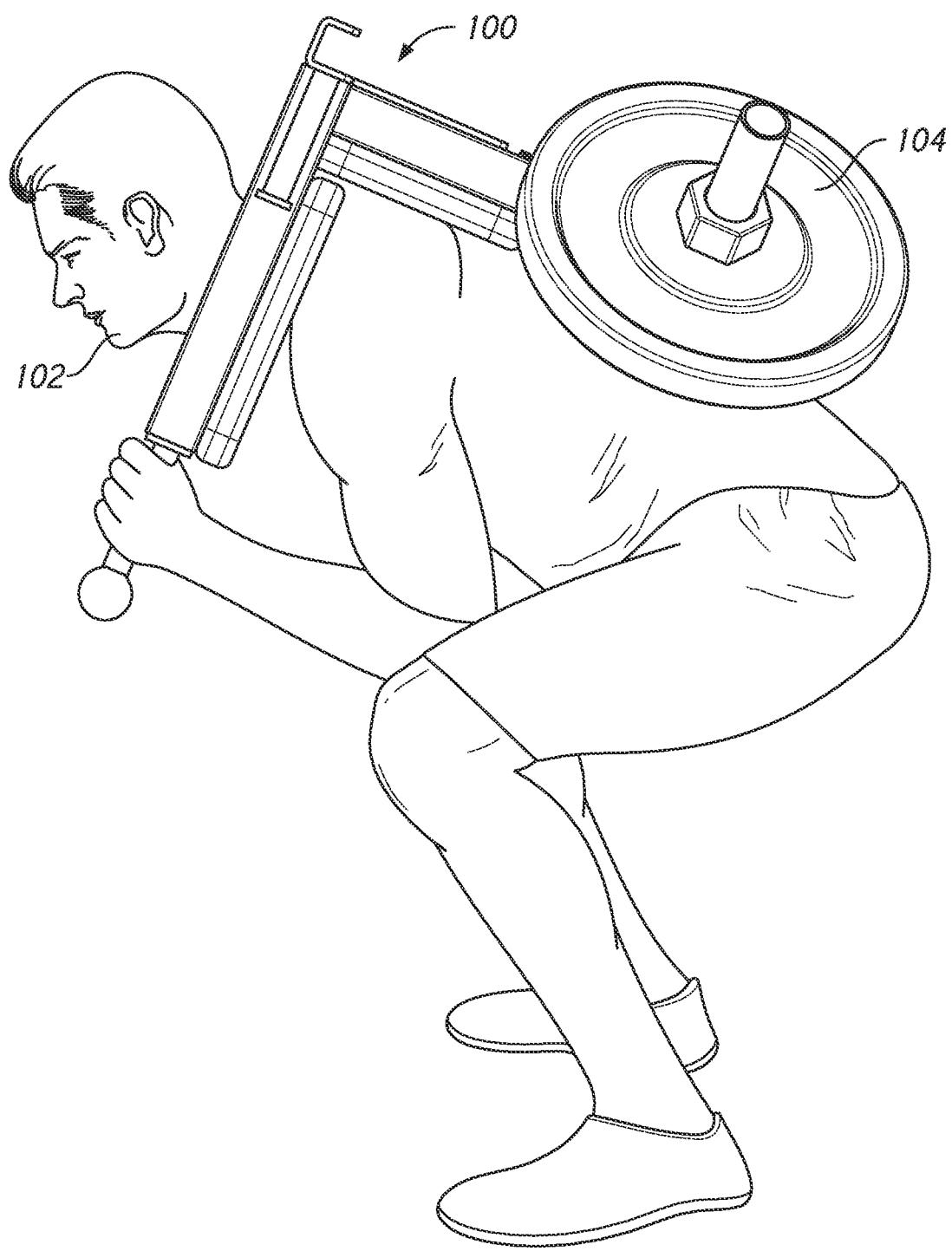
FIG. 1B is an example resistive exercise harness in use with weights.
Figure 1C:
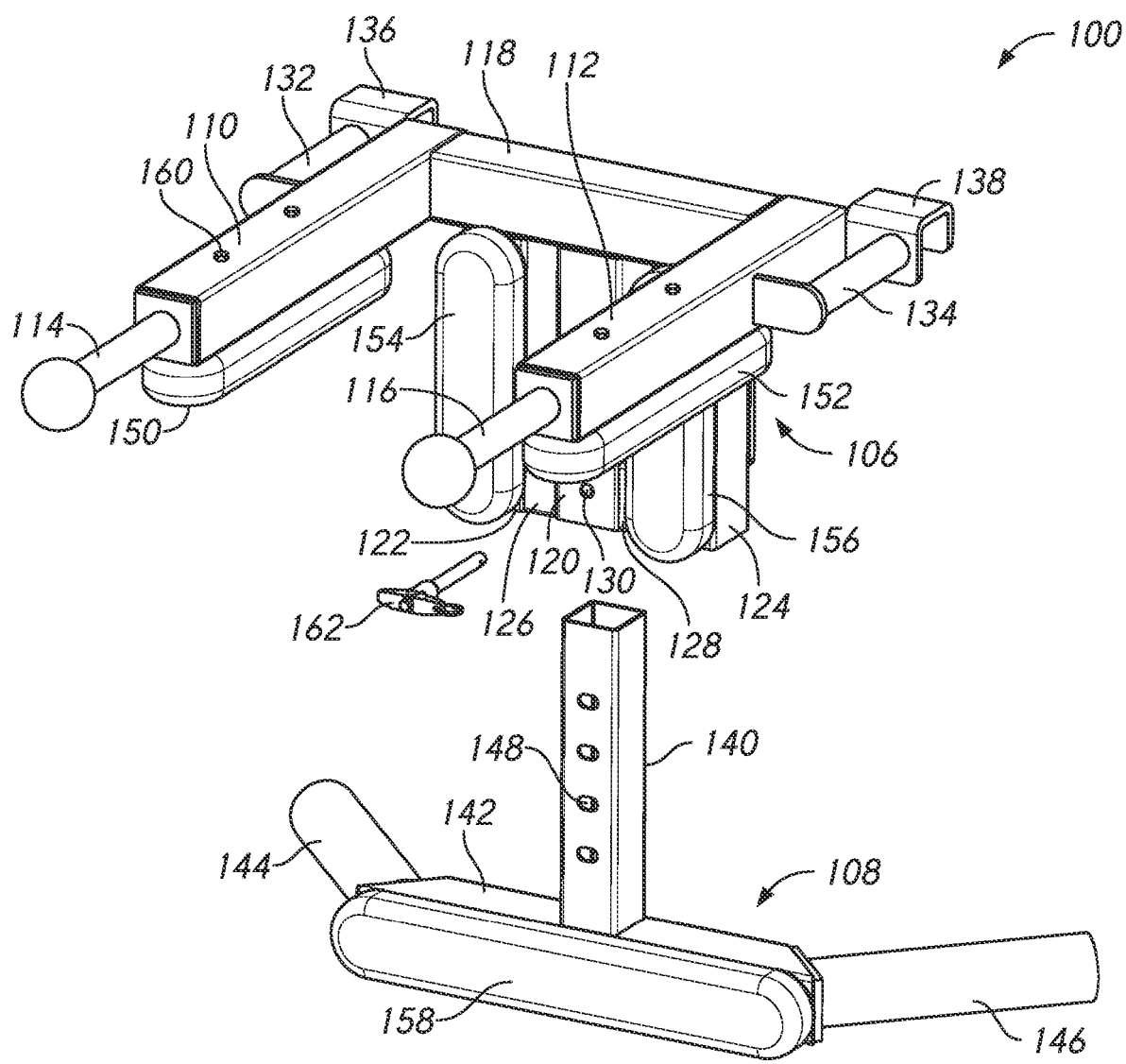
FIG. 1C is a perspective view of the resistive exercise harness.
Figure 1D:
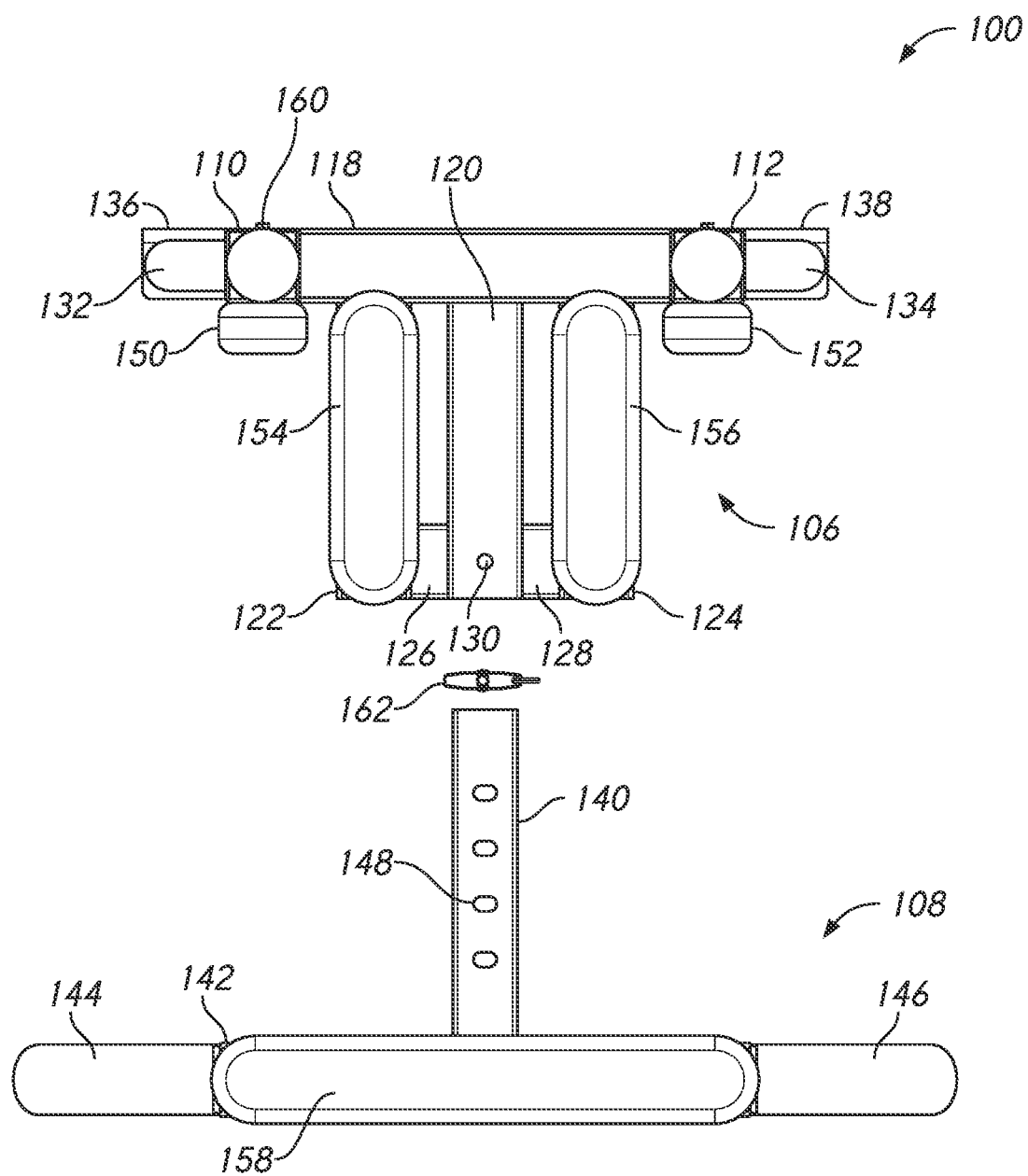
FIG. 1D is a front view of the resistive exercise harness.
Figure 1E:
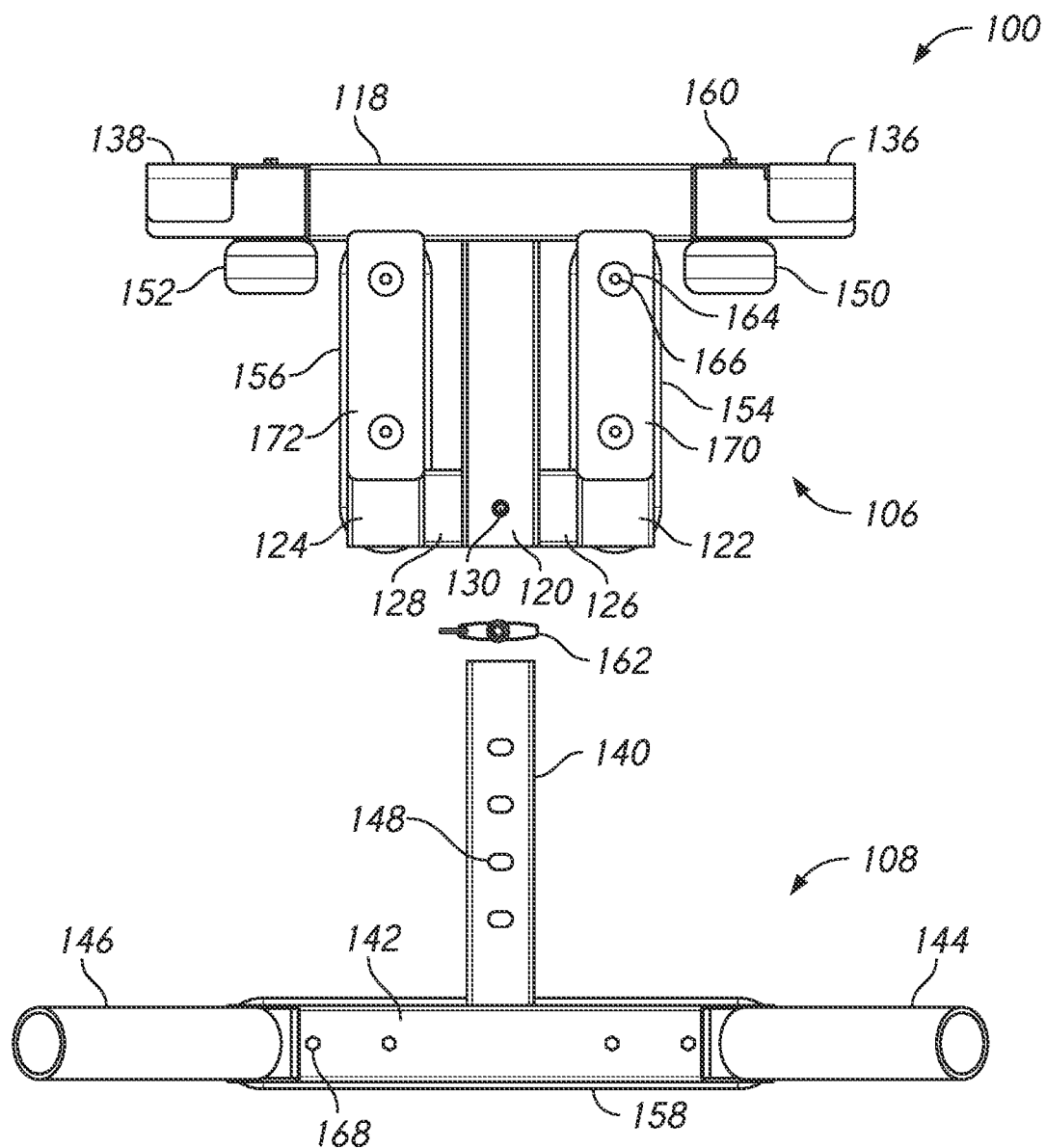
FIG. 1E is a back view of the resistive exercise harness.

FIG. 1A illustrates an example resistive exercise harness assembly 100, also referred to as the harness 100, loaded with weights 104. The harness 100 is supported on the shoulders of user 102 and extends along the back of user 102. The user 102 is in a standing position with a slight lean forward. In some configurations, in use (such as when the user 102 is standing), the harness 100 creates a fulcrum 174 with a posterior load 176 that creates an upward pitch 178 of the harness 100, as shown in FIG. 1B. In some embodiments, the fulcrum 174 is superior to the mid shoulder region of the user 102. To overcome the upward pitch 178 (torque moment), the user creates a downward force 180 using the grip handles thereby leveling the harness 100 on the shoulder of the user. The downward force 180 is initiated by using grip/upper extremity and trunk/core musculature strength/coordination, which facilitates trunk stability promoting neutral spine alignment and can reduce stress and demand on the musculature and other structures of the lower back of the user 102. In some embodiments, the weights 104 are positioned rearward of the coronal plane of the user 102. In some embodiments, the weights 104 are positioned at an angle relative the coronal plane of the user 102. In some embodiments, the weights 104 are positioned on opposing sides of the sagittal plane of the user 102. In some embodiments, the weights 104 are positioned between the shoulders and hips of the user 102. In some embodiments, the weights 104 are positioned between the mid-back and hips of the user 102. In some embodiments, the weights 104 are positioned between the upper back and hips of the user 102. In some embodiments, the weights 104 are positioned at an angle relative to the sagittal plane of the user 102. In some embodiments, the weights 104 are positioned above and/or partially above the transverse plane of the user 102.

FIG. 1B illustrates an example resistive exercise harness assembly 100, with the user 102 in a squat position.

FIGS. 1C-1I illustrate various views of an example resistive exercise harness assembly 100. The harness 100 can include an upper portion 106 and a lower portion 108. Upper portion 106 can include shoulder supports 110, 112 with shoulder pads 150, 152, upper back supports 122, 124 with upper back pads 154, 156, grip handles 114, 116 for counter force support, transporting/spotting grips 132, 134, storage/racking hooks 136, 138, and other features. Lower portion 108 can include mid/low back support 142 with mid/low back pad 158 and mounts 144, 146 for mounting weights onto the harness 100.

Figure 1F:
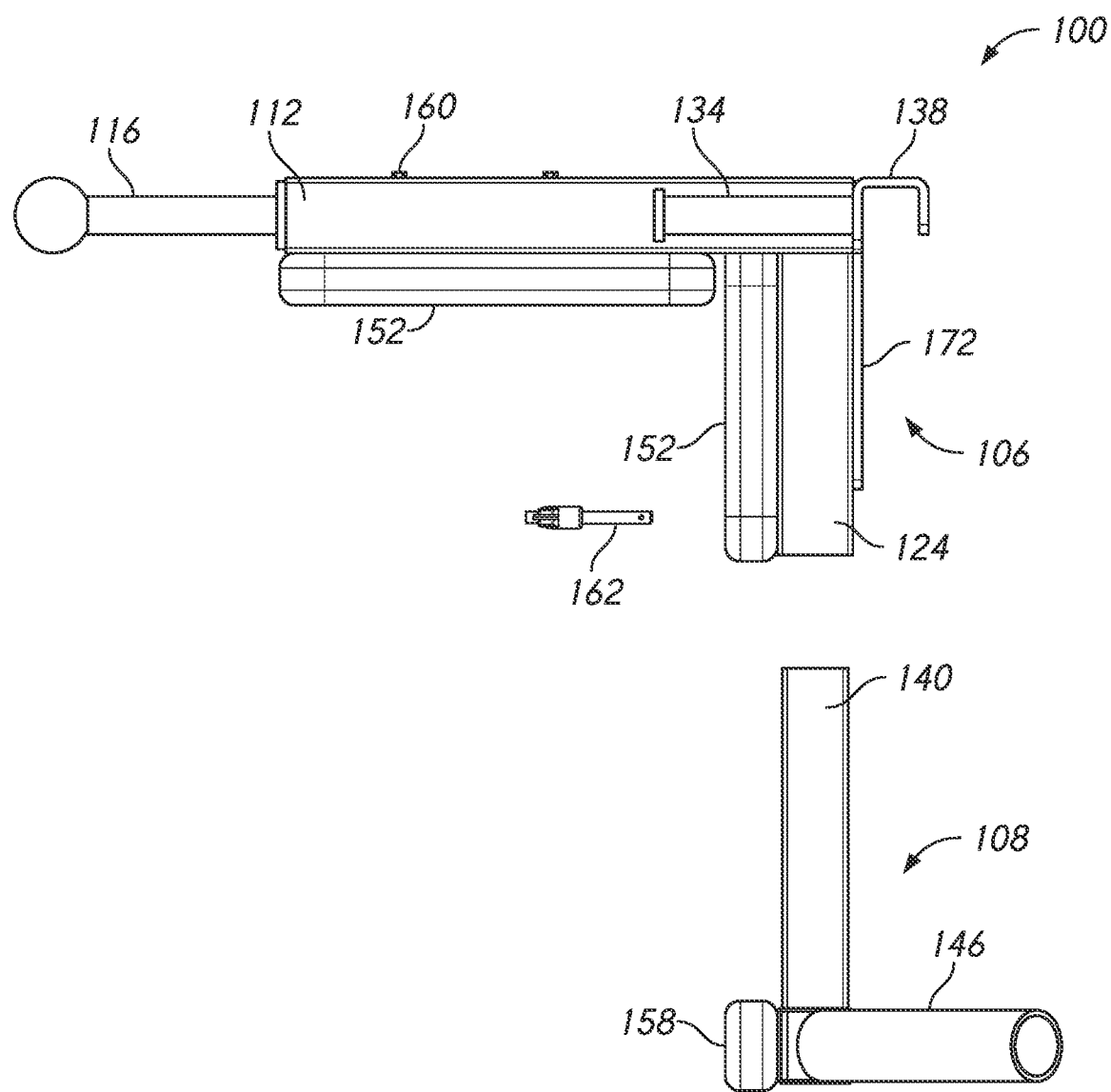
FIG. 1F is a right side view of the resistive exercise harness, with the left side being a mirror image of the right side.
Figure 1G:
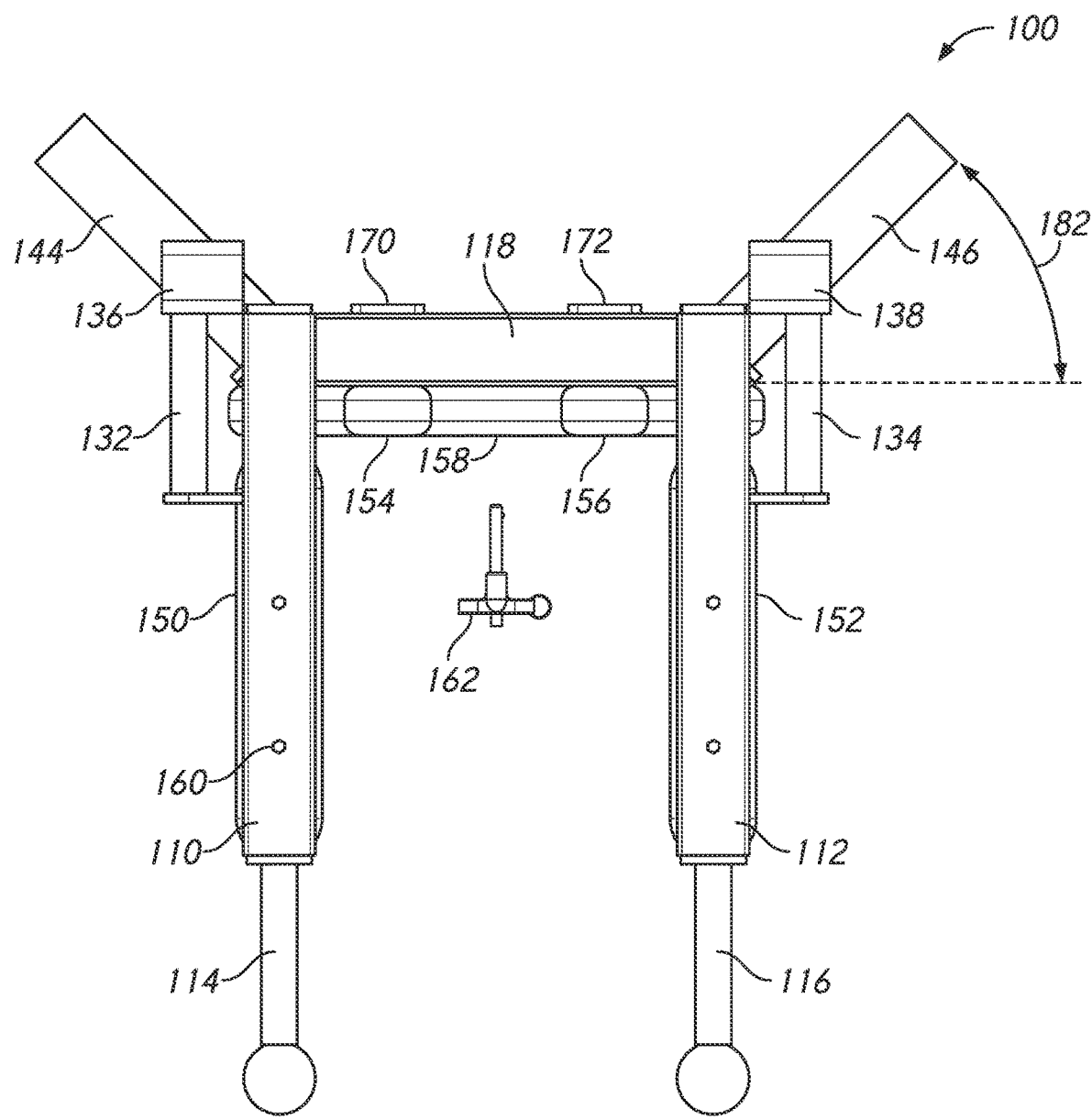
FIG. 1G is a top view of the resistive exercise harness.
Figure 1H:
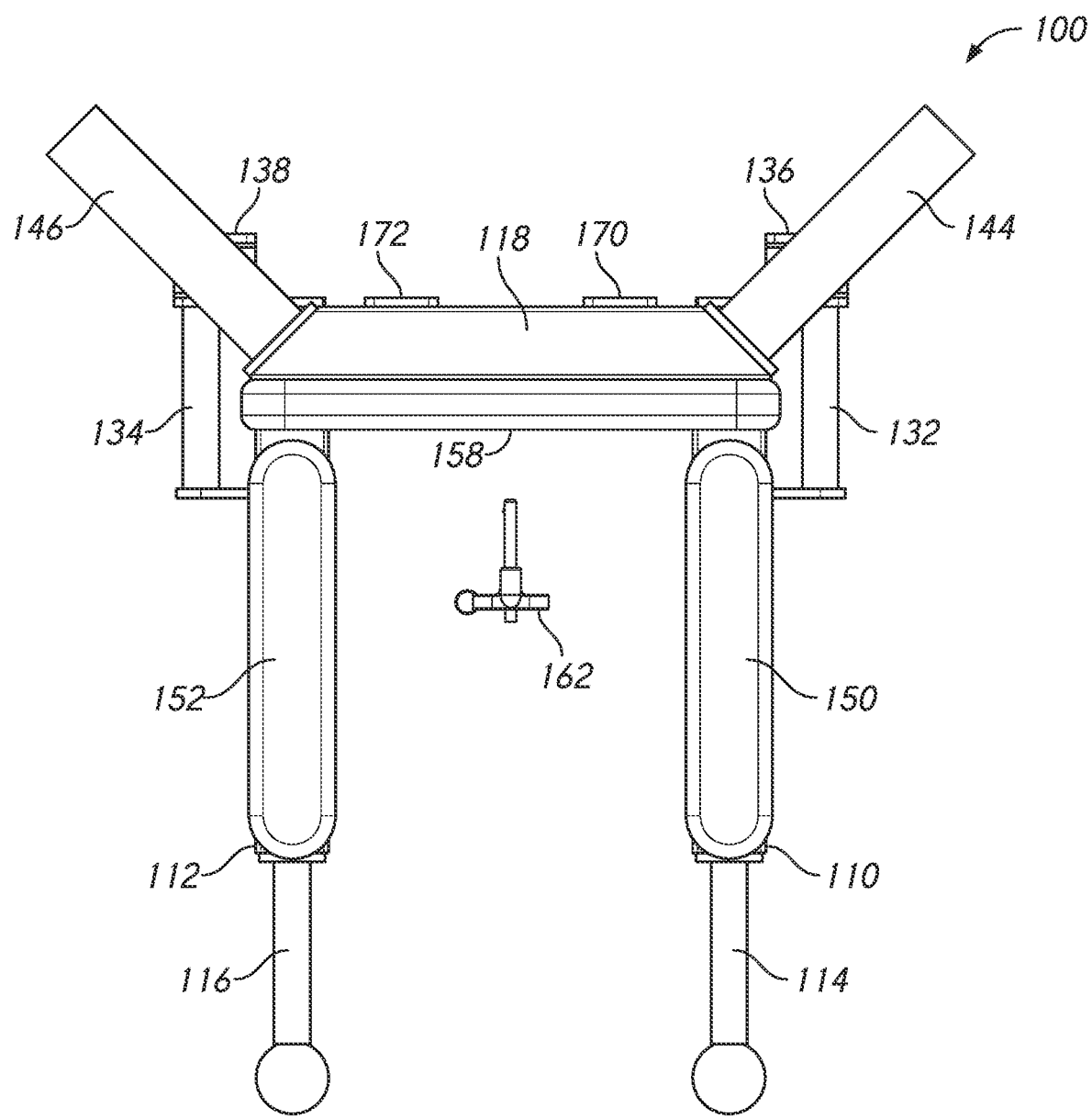
FIG. 1H is a bottom view of the resistive exercise harness.

In some embodiments, the upper portion 106 can releasably couple to the lower portion 108 with a quick release pin 162 or other suitable locking and/or adjustment mechanism. In some embodiments, the upper portion 106 and lower portion 108 form an inverted L shape when viewed from the side, as shown in FIG. 1F, when coupled together. In some embodiments, the lower portion 108 is adjustable relative to the upper portion 106 such that the harness 100 can be adjusted for users of different heights or torso lengths. The quick release pin 162 can be configured to engage with one of a plurality of adjustment holes 148 to fix the upper portion 106 to the lower portion 108 in a desired adjustment position relative to one another to accommodate different users.

A forward trunk lean by hinging at the hip is facilitated as a counter force to the posterior load as well, as illustrated in FIGS. 1A and 1B. This increases the moment arm from the line of force to the hips, creating an increased hip strategy/bias and decreases the moment arm from the line of force to the knees, which decreases the demand and stress on the knees. The moment arm can be defined as the line perpendicular from the line of force to the axis/joint, such as the hips or knees. Further, with an appropriate forward trunk lean by hinging at the hip, while maintaining a neutral spine and bilateral heel contact with the ground, force is dispersed to the harness 100 evenly through the padded contacts described herein, increasing surface area contact, which can decreases axial compressive forces on the spine and increases comfort. The harness 100 can decrease the spine lever arm, which is the distance along the user's spine between the user's lower back/pelvic (lumbopelvic) region and the load center of mass of the weights/force, relative to a barbell or the lower portion of the harness 100 that houses weights 104. The harness 100 can decrease the flexion torque moment stress on the lower back/pelvic (lumbopelvic) region of a user 102 compared to other resistive exercises/movements such as a barbell squat.

The upper portion 106 of the harness 100 can include shoulder supports 110, 112. The shoulder supports 110, 112 can be spaced apart from one another and extend in a fore-aft or anteroposterior direction. In some embodiments, the distance between the inside longitudinal surfaces of the shoulder supports 110, 112 is 10 inches. In some embodiments, the distance between the inside longitudinal surfaces of the shoulder supports 110, 112 is 8-12 inches. The shoulder supports 110, 112 can be provided in various lengths. In some embodiments, shoulder supports 110, 112 are offset from and/or parallel to each other. Rearward ends of the shoulder supports 110, 112 can be connected by an upper rear support 118. Upper rear support 118 can extend in a generally horizontal direction when the harness 100 is oriented in an upright position.

The ends of the shoulder supports 110, 112 positioned opposite the upper rear support 118 can have grip handles 114, 116. Grip handles 114, 116 can extend in a forward direction from the shoulder supports 110, 112. Grip handles 114, 116 can be configured in a variety of ways that are suitable for gripping. In some embodiments, grip handles 114, 116 have circular cross-sections to facilitate a comfortable grip. In some embodiments, grip handles 114, 116 have a sphere positioned on a distal end of grip handles 114, 116 to help prevent a user's hand from sliding off grip handles 114, 116 during use. Spheres are free of sharp edges and can also reduce the risk that the distal end of grip handles 114, 116 will injure the user or others. In some embodiments, other members may be positioned on the distal end of grip handles 114, 116 to prevent a user's hand from slipping. If desired, the grip handles 114, 116 can be canted relative to the shoulder supports 110, 112. For example, an axis of the grip handles 114, 116 can define a non-zero angle with respect to an axis of the shoulder supports 110, 112. The position of the shoulder supports 110, 112 and grip handles 114 can allow the wrists and shoulders of a user to remain in a neutral position during use (FIGS. 1A and 1B). This can provide more comfort and leverage for users that have difficulty being in increased shoulder external rotation positions which is typically required when performing squats with a barbell. In some embodiments, grip handles 114, 116 can be removable and interchangeable with a variety of grip handles having varying shapes, sizes, materials, etc. to accommodate varying preferences and/or needs.

In some embodiments, a strap and belt system can be used with the harness 100. A waist belt/strap can be positioned around the user's waist and/or torso. A strap, rope, and/or other similar device can be coupled between the waist belt/strap and grip handles 114, 116 and/or shoulder supports 110, 112. In some embodiments, this strap and belt system can counteract the upward pitch of the harness 100, as described above. In some embodiments, this can reduce and/or eliminate the downward force and/or grip force needed to be applied by a user while using harness 100. A variety of materials can be used for the waist belt/strap and/or strap, rope, and/or other similar device.

Transporting/spotting grips 132, 134 can be positioned on upper portion 106, which can include shoulder supports 110, 112. In some embodiments, transporting/spotting grips 132, 134 are each positioned on and/or proximate a rearward portion of the shoulder supports 110, 112. Transporting/spotting grips 132, 134 can be used to transport the harness 100 when not in use, allow others to spot the user when the harness 100 is in use, and/or allow others to position the harness 100 onto the user. Transporting/spotting grips 132, 134 can be configured to be easily grasped, which can include having a grasping portion that has a circular cross-section. Transporting/spotting grips 132, 134 can be spaced outwardly from and extend generally parallel to the shoulder supports 110, 112. In some embodiments, more than two transporting/spotting grips are positioned on the harness 100.

Storage/racking hooks 136, 138 can be positioned on and/or proximate a rear portion of the upper portion 106 of harness 100. Storage/racking hooks 136, 138 can be configured to allow the harness 100 to be hung from a horizontal bar, such as the crossbar of a weight rack or Olympic straight bar/barbell. Storage/racking hooks 136, 138 can be spaced apart from each other, such as located at or proximate outer corners of the upper portion 106 of the harness 100. In some embodiments, the storage/racking hooks 136, 138 can be positioned between shoulder supports 110, 112 and transporting/spotting grips 132, 134. In some embodiments, the storage/racking hooks 136, 138 can be coupled to shoulder supports 110, 112, upper rear support 118, and/or transporting/spotting grips 132, 134. In some embodiments, only one storage/racking hook is positioned on the upper portion. In some embodiments, more than two storage/racking hooks are positioned on the upper portion 106.

Upper center support 120 can extend in a downwardly direction that is perpendicular to the longitudinal direction of the upper rear support 118. Upper center support 120 can extend in a vertical direction between the upper rear support 118 and mid/low back support 142. Upper back supports 122, 124 can be positioned on opposing sides of upper center support 120. Upper back supports 122, 124 can have lengths that are equal to each other and/or upper center support 120. Upper back supports 122, 124 can extend in a vertical direction and be offset from the upper center support 120. Ends of upper back supports 122, 124 can be coupled to upper rear support 118. Connectors 126, 128 can be positioned between upper back supports 122, 124 and the upper center support 120 proximate the ends of upper back supports 122, 124 opposite the upper rear support 118. Connectors 126, 128 can help maintain the structural integrity and rigidity of the harness 100.

In some embodiments, panels 170, 172, also referred to as slide plates 170, 172, are positioned on a rear facing surface of upper back supports 122, 124 that is opposite the grip handles 114, 116. Panels 170, 172 can have apertures that create recesses 164 when panels 170, 172 are positioned on upper back supports 122, 124. Bolts 166 can be positioned within recesses 164 to secure the upper back pads 154, 156 to the upper back supports 122, 124. Positioning the bolts 166 in the recesses 164 can reduce the risk that bolts 166 will unintentionally snag or catch on other objects. In some embodiments, a top portion of panels 170, 172 extends onto a back surface of upper rear support 118. This can help maintain the structural integrity of the harness 100. In some embodiments, slide plates 170, 172 provide the surface areas of contact that assist a user as the user mounts/removes the storage/racking hooks 136, 138 onto/from a crossbar of the portable rack 200 or any supported Olympic straight bar/barbell, to position or remove the harness 100 in/from the resting position shown in FIG. 2A. To mount the harness 100 onto a crossbar, a user can position slide plates 170, 172 against the crossbar and move the harness 100 down until storage/racking hooks 136, 138 interface with the crossbar, allowing the harness 100 to hang. The recesses 164 of the slide plates 170, 172 can allow the harness 100 to smoothly slide against the crossbar without bolts 166 coming in contact with the crossbar. To unmount the harness 100 from a crossbar, a user can move the harness 100 up while maintaining contact with slide plates 170, 172 until the storage/racking hooks 136, 138 are not engaged with the crossbar.

Upper center support 120 can have an internal cavity that is configured to receive lower center support 140 of lower portion 108. Lower center support 140 can have a plurality of adjustment holes 148. A portion of lower center support 140 can be positioned in the internal cavity of the upper center support 120. The upper center support 120 can have a locking hole 130 that can be aligned with one of the plurality of adjustment holes 148 of the lower center support 140. Upper portion 106 and lower portion 108 can be releasably fixed together by positioning quick release pin 162, or locking mechanism, through the locking hole 130 and one of the desired adjustment holes 148. In some embodiments, quick release pin 162 is a t-handle quick release (e.g., spring-biased) pin that has an actuator to lock and unlock the quick release pin 162. This can allow the lower portion 108 to be moved relative to the upper portion 106 to different positions to allow the harness 100 to accommodate different user's preferences and/or sizes. For example, a user with a small torso can lock the lower portion 108 to the upper portion 106, such that the distance between the mid/low back support 142 and the upper rear support 118 is shortened. A user with a longer torso can lock the lower portion 108 to the upper portion 106, such that the distance between the mid/low back support 142 and the upper rear support 118 is lengthened. In some embodiments, the lower center support 140 has four adjustment holes 148 corresponding to four distinct positions. In some embodiments, the quick release pin 162, or other locking mechanism, facilitates the lower portion to be moved and fixed to the upper portion along a continuum of positions (e.g., infinitely adjustable). In some embodiments, the quick release pin 162, or locking mechanism, is positioned within upper center support 120 or between the upper center support 120 and the mid/low back support 142. In some embodiments, the lower portion 108 is not adjustable relative to the upper portion 106. In some embodiments, the lower portion 108 is fixed relative to the upper portion 106 such that the harness 100 is fixed—being nonadjustable.

Lower center support 140 can be coupled to the mid/low back support 142. Lower center support 140 can extend vertically from the mid/low back support 142. Lower center support 140 can have a size that is configured to allow the lower center support 140 to be inserted into the internal cavity of upper center support 120. Mid/low back support 142 can extend in a horizontal direction when harness 100 is oriented in an upright position.

Figure 1I:
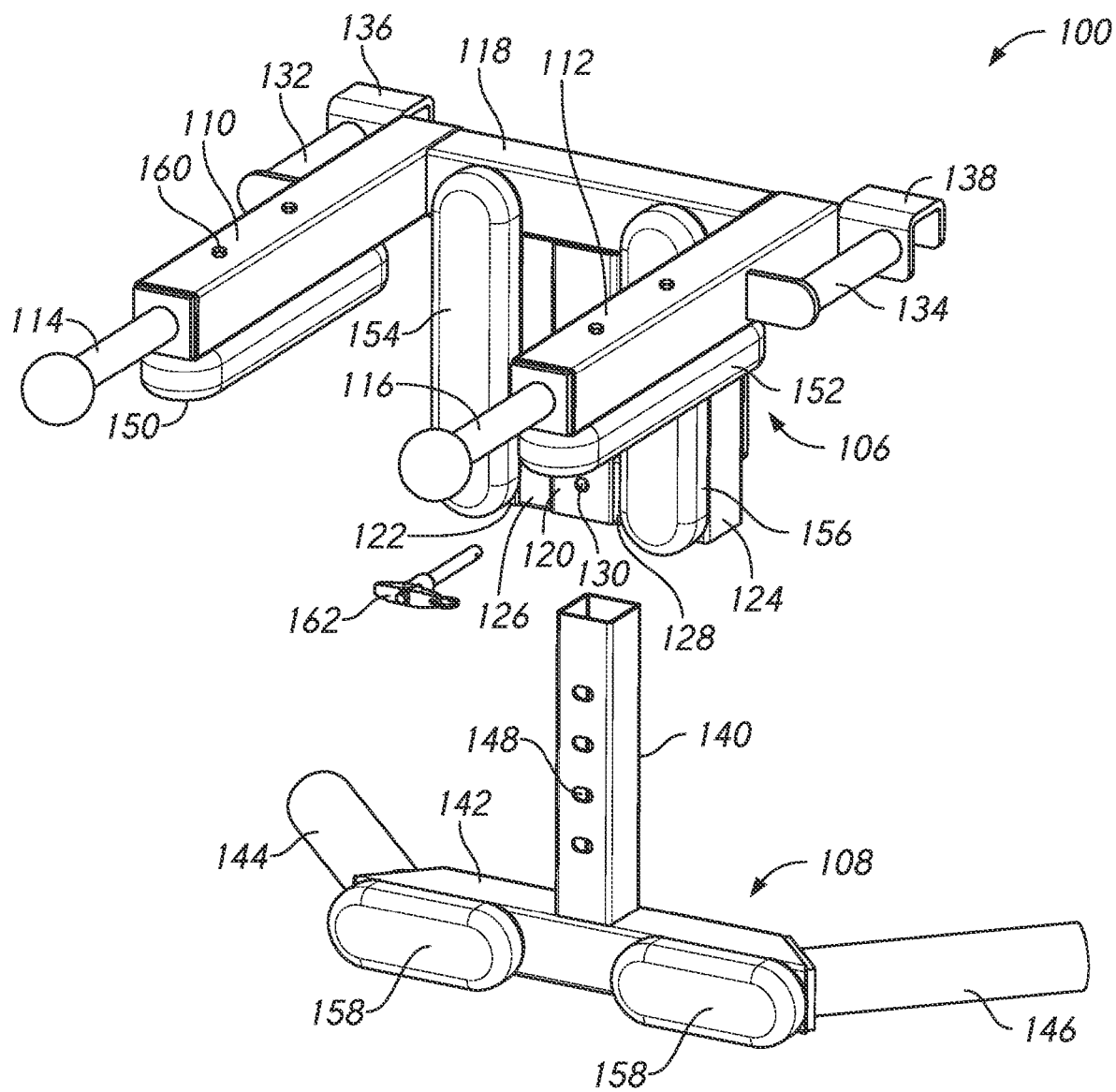
FIG. 1I is a perspective view of the resistive exercise harness.

Pads, also referred to as cushioned pads, can be positioned at various locations on the harness 100 to provide a level of comfort for the user. Pads can be a variety of sizes. Shoulder pads 150, 152 can be positioned on the bottom surface of shoulder supports 110, 112. Shoulder pads 150, 152 can be releasably coupled to shoulder supports 110, 112 with suitable fasteners, such as bolts 160. Shoulder pads 150, 152 can be configured to engage (e.g., rest upon) a user's shoulders when the harness 100 is in use. In some embodiments, the distance between the inside longitudinal surfaces of the shoulder pads 150, 152 is 8 inches. In some embodiments, the distance between the inside longitudinal surfaces of the shoulder pads 150, 152 is 6-10 inches. Upper back pads 154, 156 can be positioned on the forward facing surface of upper back supports 122, 124. Upper back pads 154, 156 can be releasably coupled to upper back supports 122, 124 with suitable fasteners, such as bolts 166. In some embodiments, as shown in FIG. 1I, upper back pads 154, 156 can extend to the height of the top surface of upper rear support 118 or a separate pad or pads can be positioned on upper rear support 118. This can protect the head/neck of the user from coming in contact with the supports, including upper rear support 118. The gap between the upper back pads 154, 156 can assist in avoiding direct pressure on the spinal column of the user. In some embodiments, there is no gap between upper back pads 154, 156. In some embodiments, a single upper back pad, with no gaps, is used to protect a user's back from coming in contact with supports of the upper portion 106. One or more mid/lower back pads 158 can be positioned on a forward surface of mid/low back support 142. One or more mid/lower back pads 158 can be releasably coupled to mid/low back support 142 with suitable fasteners, such as bolts 168. In some embodiments, one mid/lower back pad 158 is positioned on the mid/low back support with no gap. In some embodiments, as shown in FIG. 1I, mid/low back support 142 can include a center gap to avoid direct pressure on the spinal column of the user. In some embodiments, the gap in the mid/low back support 142 is approximately 1-6 inches. In some embodiments, the gap in the mid/low back support 142 is approximately 2-4 inches. In some embodiments, the pads can be removed and replaced with new pads as needed due to wear and/or user comfort. The pads can be made of any one or combination of a variety of materials, which can include leather, polymers, foam, and/or other suitable materials. In some embodiments, the harness 100 does not have any pads.

As described above, harness 100 is configured to carry a resistive load, which can be in the form of barbell/bumper plates/weights 104 (small and large). Accordingly, harness 100 can have a support arrangement for supporting a resistive load in the form of plate-type barbell weights 104. Mounts 144, 146 can be positioned on mid/low back support 142 and be configured to support weights 104. In some embodiments, mounts 144, 146 are cylindrical bars with outer diameters configured to interface with a center hole of weights 104 such that a user can add weights 104 to the harness 100. Mounts 144, 146 can extend outwardly from harness 100, and in particular from opposing ends of the mid/low back support 142, such that the weights 104 are located along the mid/low back of the user during use of the harness 100. In some embodiments, mid/low back support 142 has slanted surfaces on each of its ends upon which mounts 144, 146 are coupled. Preferably, mounts 144, 146 extend rearwardly from the harness 100, and in particular from opposing ends of the mid/low back support 142. Such an arrangement advantageously orients the weights 104 in a space-efficient manner to avoid or limit contact with the user, while positioning the weights 104 close to the user to reduce the moment arm acting on the fulcrum location. The angle 182 of the mounts 144, 146 can be between about 30-60 degrees rearwardly from the mid/low back support 142 or from the anteroposterior axis of the user in the use of the harness 100. In some embodiments, the angle can be about 40-50 degrees or about 45 degrees. In some embodiments, the distance between the free ends of mounts 144, 146 is approximately 26 inches. In some embodiments, the distance between the free ends of the mounts 144, 146 is approximately 22-30 inches or 18-34 inches. In some embodiments, the distance between the side surface of lower center support 140 nearest mount 146 and mount 146 is 3.5-7.5 inches or 2-17 inches, which includes approximately 5.5 inches. In some embodiments, the distance between the side surface of lower center support 140 nearest mount 144 and mount 144 is 3.5-7.5 inches or 2-17 inches, which includes approximately 5.5 inches. In some embodiments, barbell/weight collars can be used to secure weights onto mounts 144, 146. The mounts 144, 146 can have different diameters to accommodate a variety of center hole diameters of weights/plates.

In some embodiments, the shoulder supports 110, 112 can be lengthened or shortened using a configuration similar to the interface between the top portion 106 and the bottom portion 108. In some embodiments, the shoulder supports 110, 112 can be lengthened or shortened using a telescoping configuration.

Rack

Figure 2A:
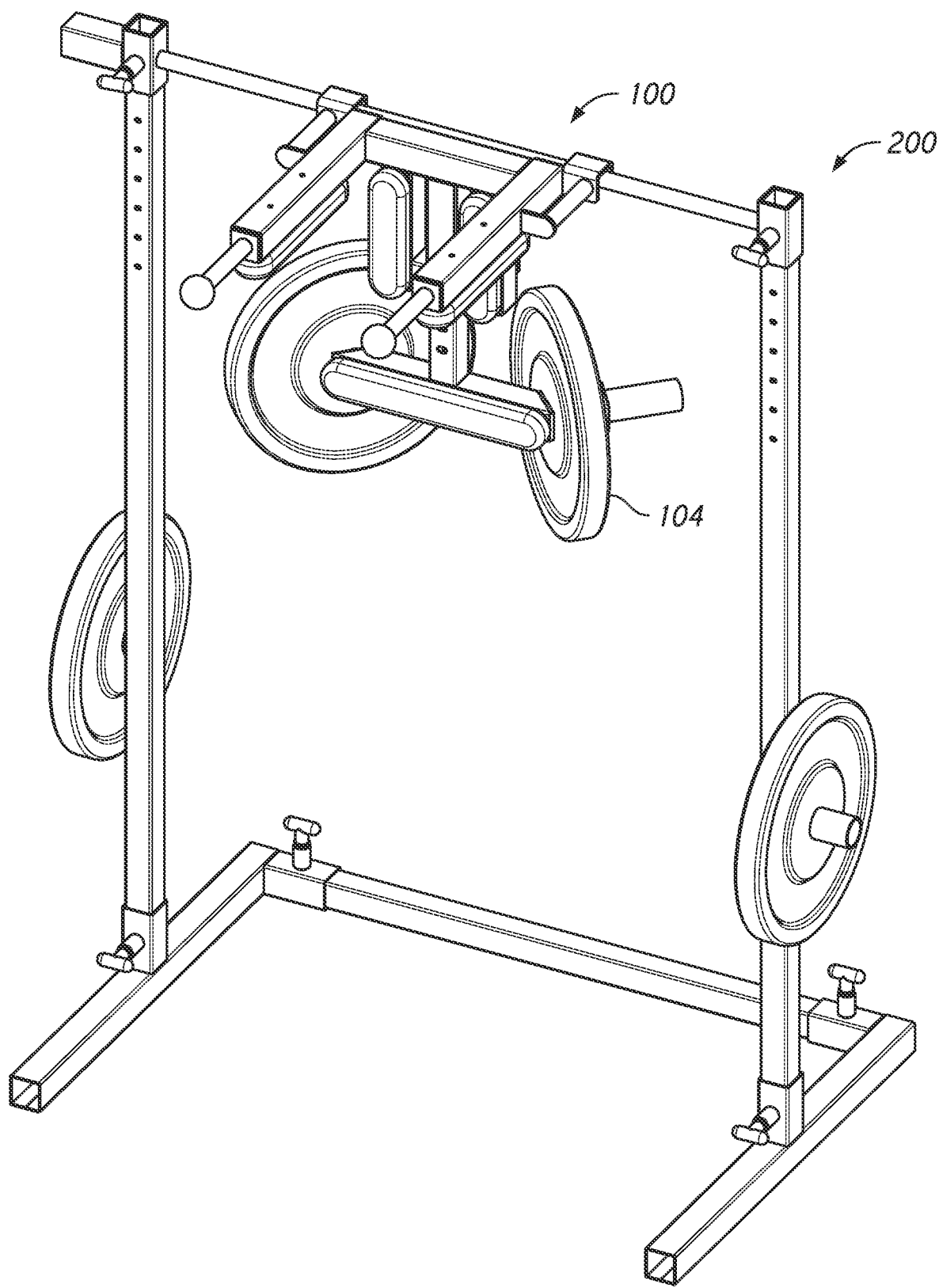
FIG. 2A is an example rack supporting a resistive exercise harness and weights.
Figure 2B:
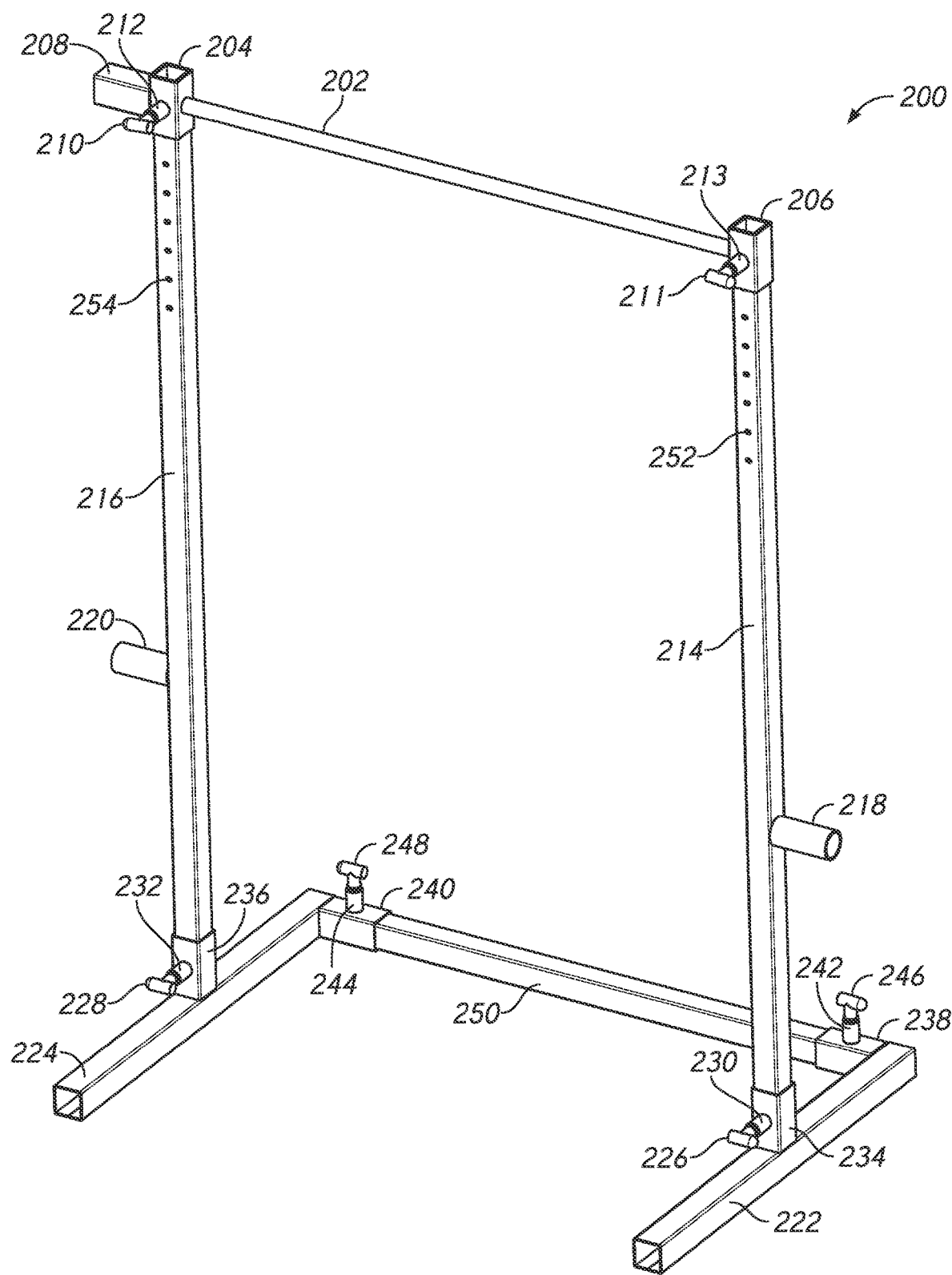
FIG. 2B is a perspective view of the rack.
Figure 2C:
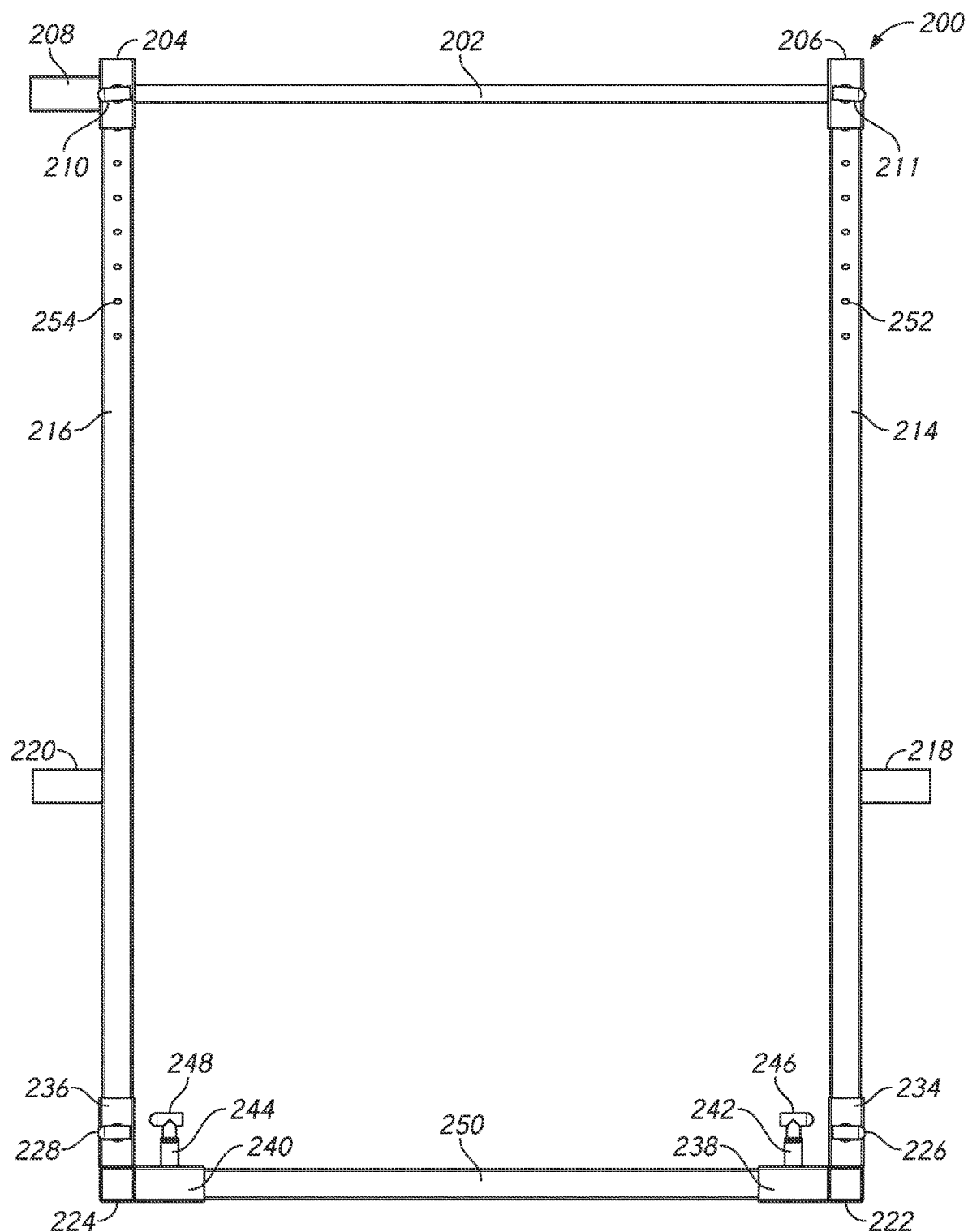
FIG. 2C is a front view of the rack.
Figure 2D:
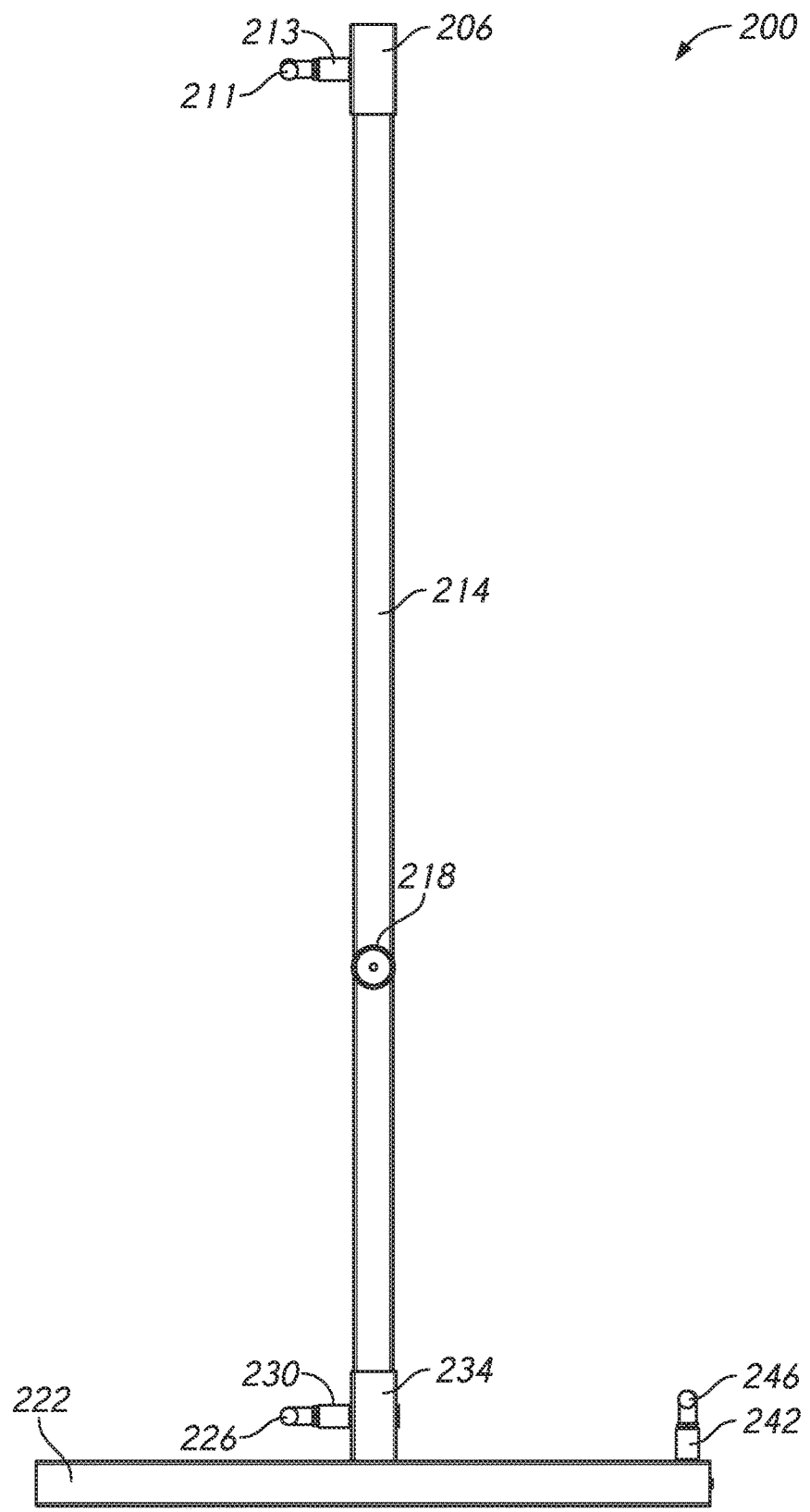
FIG. 2D is a side view of the rack.

FIG. 2A illustrates an example weight rack 200, also referred to as the rack 200, supporting harness 100 with mounted weights 104. This configuration can assist a user to mount a weighted harness 100 onto the user for use. The rack 200 can also support extra weights 104 not mounted on the harness 100.

Figure 2E:
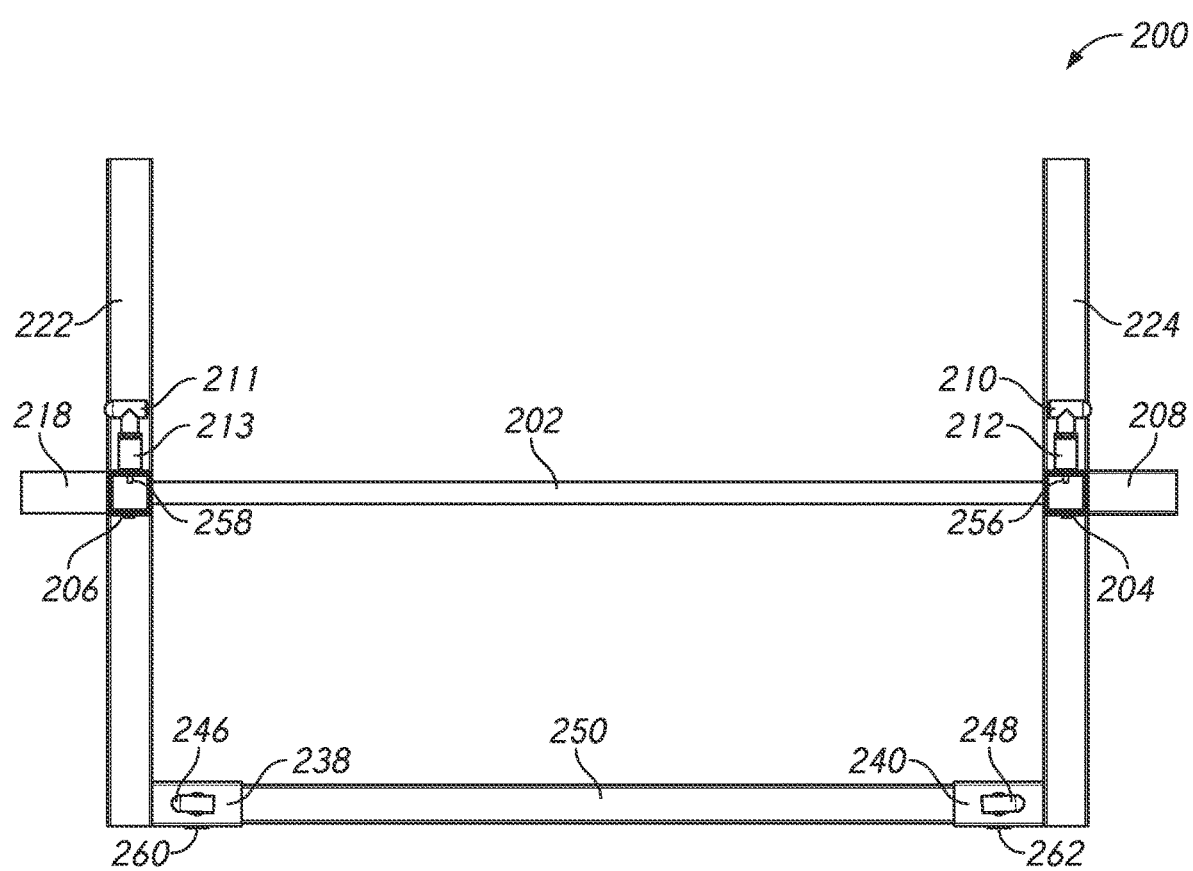
FIG. 2E is a top view of the rack.
Figure 2F:
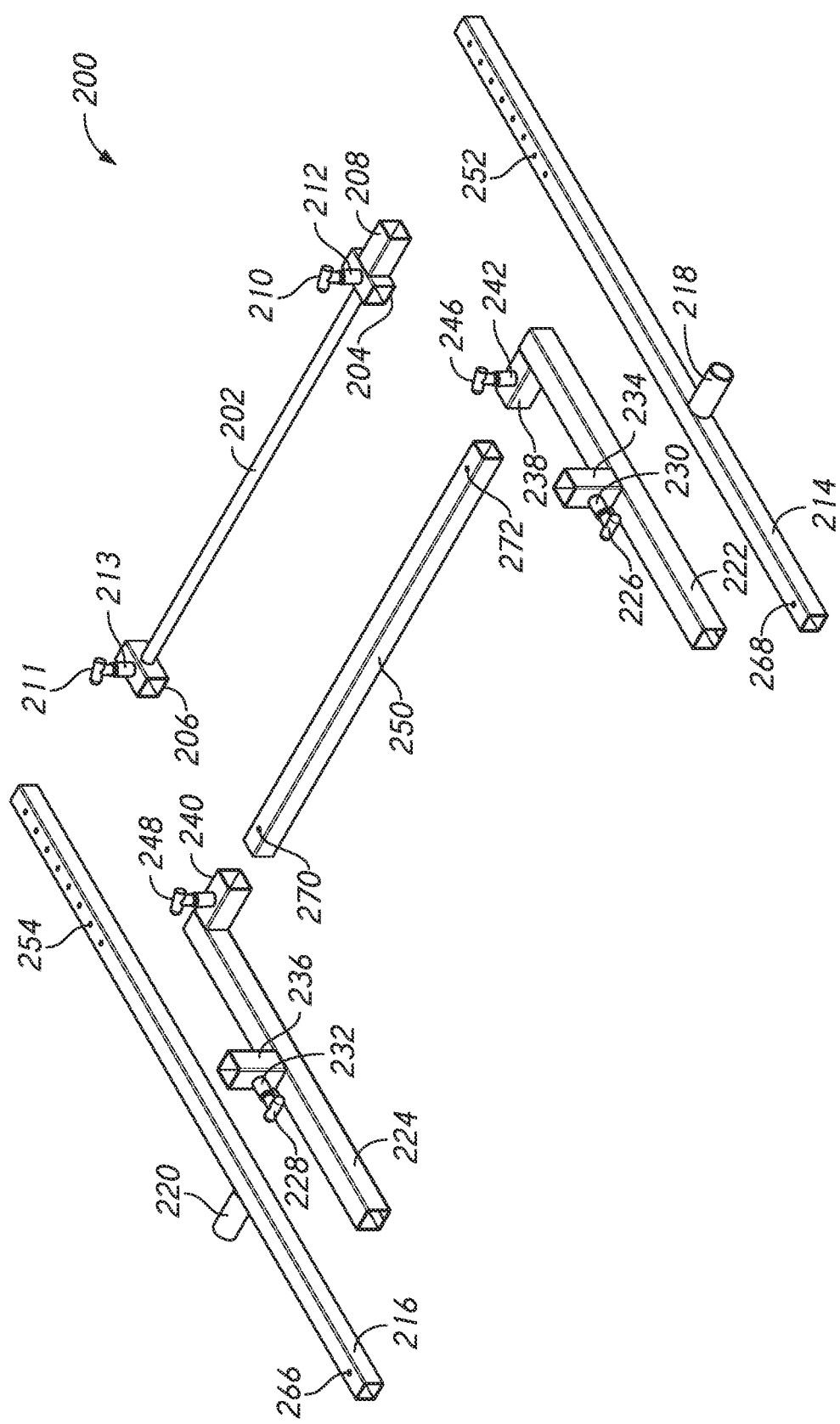
FIG. 2F is perspective view of the rack in a disassembled state.

FIGS. 2B-2G illustrate various views of an example rack 200. As illustrated in FIG. 2F, the rack 200 can be disassembled and reassembled. The portability of rack 200 offers for easy transport, disassembly, and reassembly. As illustrated in FIGS. 2A-2E, the rack 200 can be assembled to support harness 100 and, optionally, weights 104.

Bottom supports 222, 224 and bottom cross support 250 can be coupled together to form a secure base for rack 200. Bottom supports 222, 224 can have bottom connector portions 238, 240 that are configured to receive the opposing ends of bottom cross support 250. Bottom connector portions 238, 240 can extend transversely from the longitudinal direction of bottom supports 222, 224. Bottom connector portions 238, 240 can have internal cavities configured to receive ends of bottom cross support 250. Bottom cross support 250 can have locking holes 270, 272 positioned proximate each of the ends of bottom cross supports 250. Bottom connector portions 238, 240 can have locking pin interfaces 242, 244 that are configured to house at least a portion of locking pins 246, 248. Locking pins 246, 248 can be favorably positioned such that an end of locking pins 246, 248, such as locking pin ends 256, 258, each extend respectively into internal cavities of bottom connector portions 238, 240. In some embodiments, springs position the locking pins 246, 248 such that an end of locking pins 246, 248 (FIG. 2E) are favorably positioned to extend into internal cavities of connector portions 238, 240. In some embodiments, locking pins 246, 248 can be actuated between a locked position, extending ends of locking pins 246, 248 into connector portions 238, 240, and unlocked position, removing ends of locking pins 246, 248 from connector portions 238, 240.

Figure 2G:
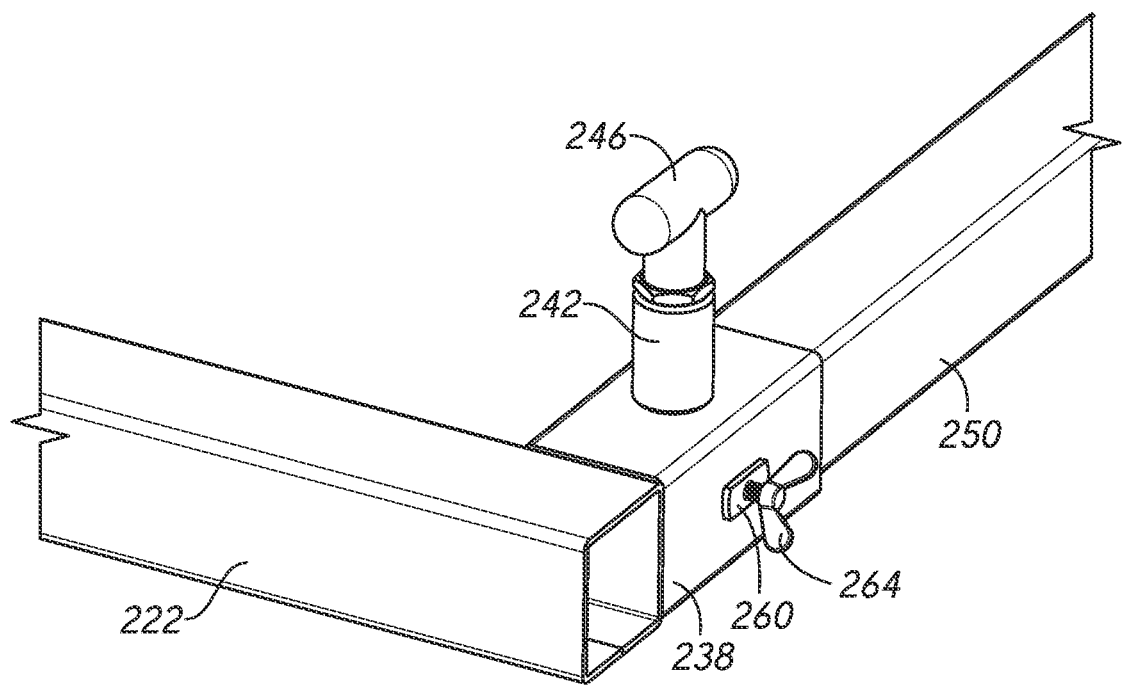
FIG. 2G is an example connector portion of a rack.

The bottom connector portions 238, 240 can be coupled to bottom cross support 250 by actuating the locking pins 246, 248, for example by pulling them, such that locking pins 246, 248 do not obstruct the internal cavities of bottom supports 222, 224, and positioning the ends of bottom cross support 250 into bottom connector portions 238, 240, such that the locking pins 246, 248 interface with the locking holes 270, 272. In some embodiments, a spring locks the locking pins 246, 248 into locking holes 270, 272. In some embodiments, locking pins 246, 248 disengage from locking holes 270, 272 when locking pins 246, 248 are pulled, removing locking pins 246, 248 from locking holes 270, 272, As shown in FIGS. 2E and 2G, bottom connector portions 238, 240 can have contact surfaces 260, 262 with threaded apertures that interface with thumb fasteners 264. In addition to coupling with locking pins 246, 248 as described herein, thumb fasteners 264 can be tightened to further ensure a secure coupling. Thumb fasteners can, in some embodiments, be used with any coupling involving locking pins disclosed herein.

Bottom supports 222, 224 can have upright connector portions 234, 236. Upright connector portions 234, 236 can be positioned, for example, generally midway between the ends of bottom supports 222, 224. Upright connector portions 234, 236 can extend transversely from the longitudinal direction of bottom supports 222, 224. Upright connector portions 234, 236 can have internal cavities configured to receive upright supports 214, 216. Upright supports 214, 216 can have locking holes 266, 268 positioned proximate the ends of upright supports 214, 216. Upright connector portions 234, 236 can have locking pin interfaces 230, 232 that house at least a portion of locking pins 226, 228. Upright connector portions 234, 236 can couple to upright supports 214, 216 in the same or similar manner as described in reference to coupling bottom connector portions 238, 240 to bottom cross support 250. In some embodiments, upright connector portions 234, 236 can include contact surfaces and thumb fasteners as described herein.

Upright supports 214, 216 can have weight storage mounts 218, 220 that are configured to store weights. In some embodiments, weight storage mounts 218, 220 are cylindrical, such that the weight storage mounts 218, 220 interface with the center holes of weights. Weight storage mounts 218, 220 can extend in a transverse direction to the longitudinal direction of upright supports 214, 216. In some embodiments, positioning weights 104 onto weight storage mounts 218, 220 can reinforce and/or stabilize rack 200 from undesirable motion when mounting harness 100, onto rack 200 or the user, with increased loads. In some embodiments, weight storage mounts 218, 220 can have a different diameters to accommodate a variety of center hole diameters of weights/plates.

Upright supports 214, 216 can have a plurality of adjustment holes 252, 254 positioned proximate an end of upright supports 214, 216 that is opposite the locking holes 266, 268. Adjustment holes 252, 254 can facilitate moving the upper cross support 202 to different positions to accommodate user's preferences and heights.

Upper cross support 202 can have upper connector portions 204, 206 positioned on opposing ends of upper cross support 202. The portion of upper cross support 202 extending between upper connector portions 204, 206 can have any one or more of various possible cross-sectional shapes and sizes, which can include circular such as an Olympic straight bar/barbell, and is the location upon which storage/racking hooks 136, 138 can hang harness 100. In some embodiments, the portion of upper cross support 202 extending between upper connector portions 204, 206 is made of round stock metal bar or tubing. This portion, in some embodiments, can be used for upper body exercises such as pull ups, muscle ups, etc. In some embodiments, the rack 200 does not have an upper cross support 202. In some embodiments, rack 200 has connectors, such as hooks, positioned on upright supports 214, 216 that can support an Olympic straight bar/barbell. In some embodiments, the connectors can be adjustable to different positions on the upright supports 214, 216.

Upper connector portions 204, 206 can extend in a direction that is transverse to the longitudinal direction of upper cross support 202. When rack 200 is assembled, this can position upper connector portions 204, 206 such that upper connector portions 204, 206 extend vertically. Upper connector portions 204, 206 can have locking pin interfaces 212, 213 that at least partially house locking pins 210, 211. Locking pins 210, 211 can function as other locking pins disclosed herein. In some embodiment, upper connector portions 204, 206 can include contact surfaces and thumb fasteners as described herein.

Upper connector portions 204, 206 can be hollow, having internal cavities that are configured to receive upright supports 214, 216. Storage connector portion 208 can be coupled to upper connector portion 204 to allow upper cross support 202 to fit conveniently into/onto cart 300 when rack 200 is dissembled. Storage connector portion 208 can extend coaxially with the longitudinal axis of cross support 202.

Upper cross support 202 can be adjusted to different heights to accommodate user's preferences and sizes. Upper connector portions 204, 206 can move to different positions on upright supports 214, 216 to align locking pins 210, 211 with adjustment holes 252, 254. Upper connector portions 204, 206 can be coupled to adjustment holes 252, 254 with locking pins 210, 211 as described in reference to other locking pins disclosed herein. In some embodiments, thumb fasteners can also be used.

In some embodiments, the rack 200 is configured to withstand a substantial amount of weight, such as greater than or equal to 500 pounds. In some embodiments, the rack 200 is configured to support at least 100, 200, 300, 400, 500, 600, 700, 800, 900, and/or 1000 pounds.

In a dissembled state, as illustrated in FIG. 2F, rack 200 can be easily transported with cart 300. The supports, described above, can interface with connecting supports of cart 300 to conveniently transport the rack 200.

Cart

Figure 3A:
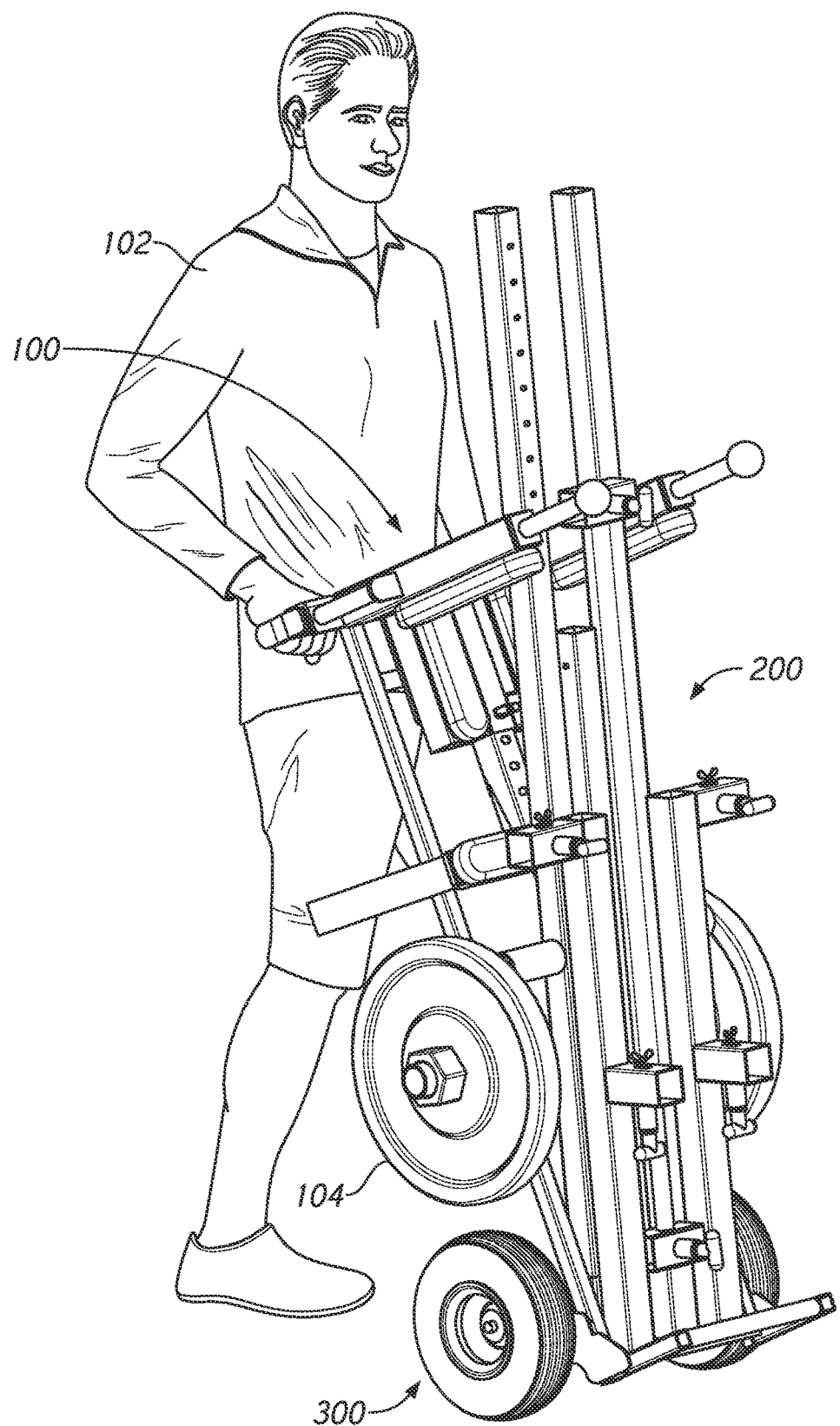
FIG. 3A is an example cart in use with weights, a resistive exercise harness, and a rack.
Figure 3B:
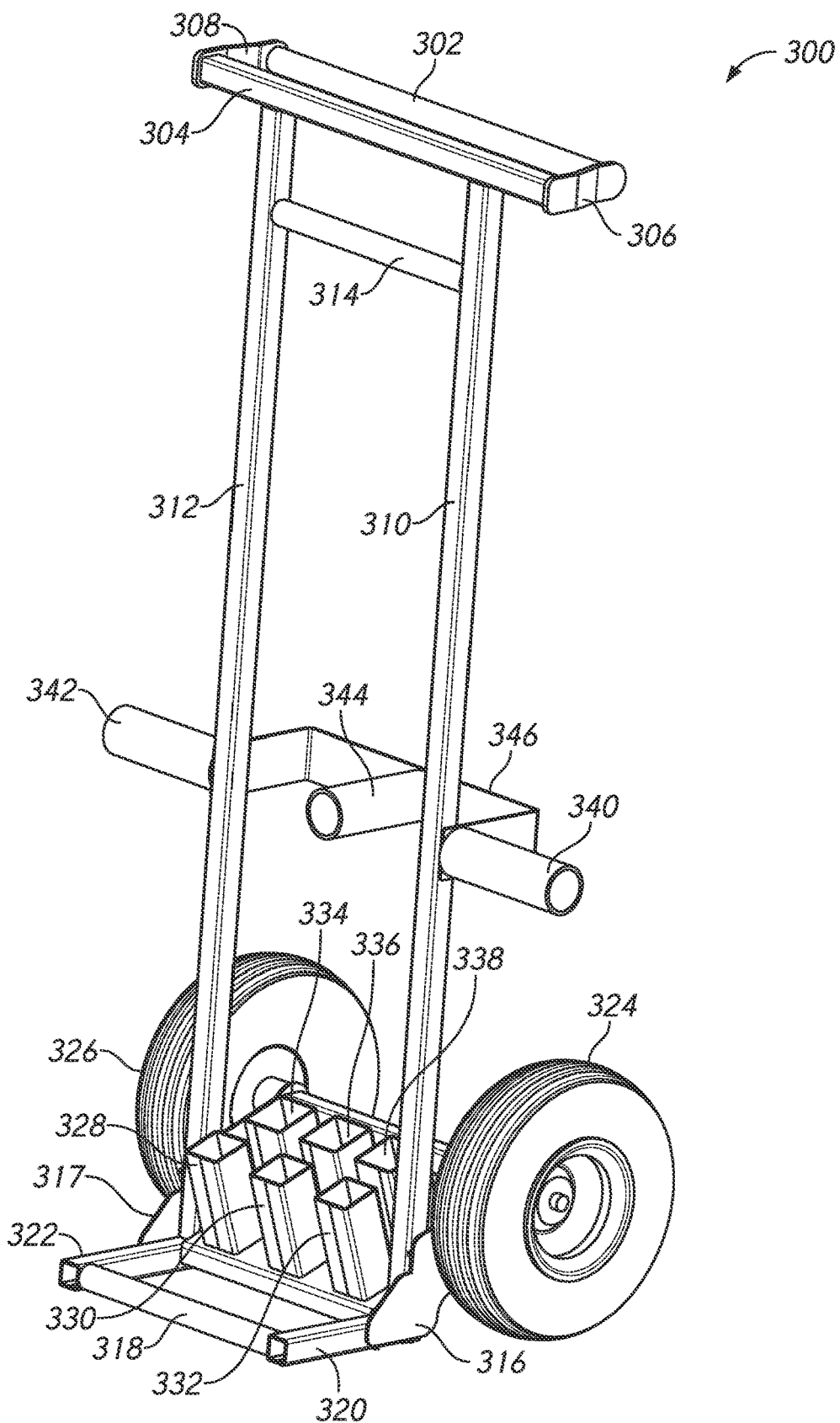
FIG. 3B is a perspective view of the cart.
Figure 3C:
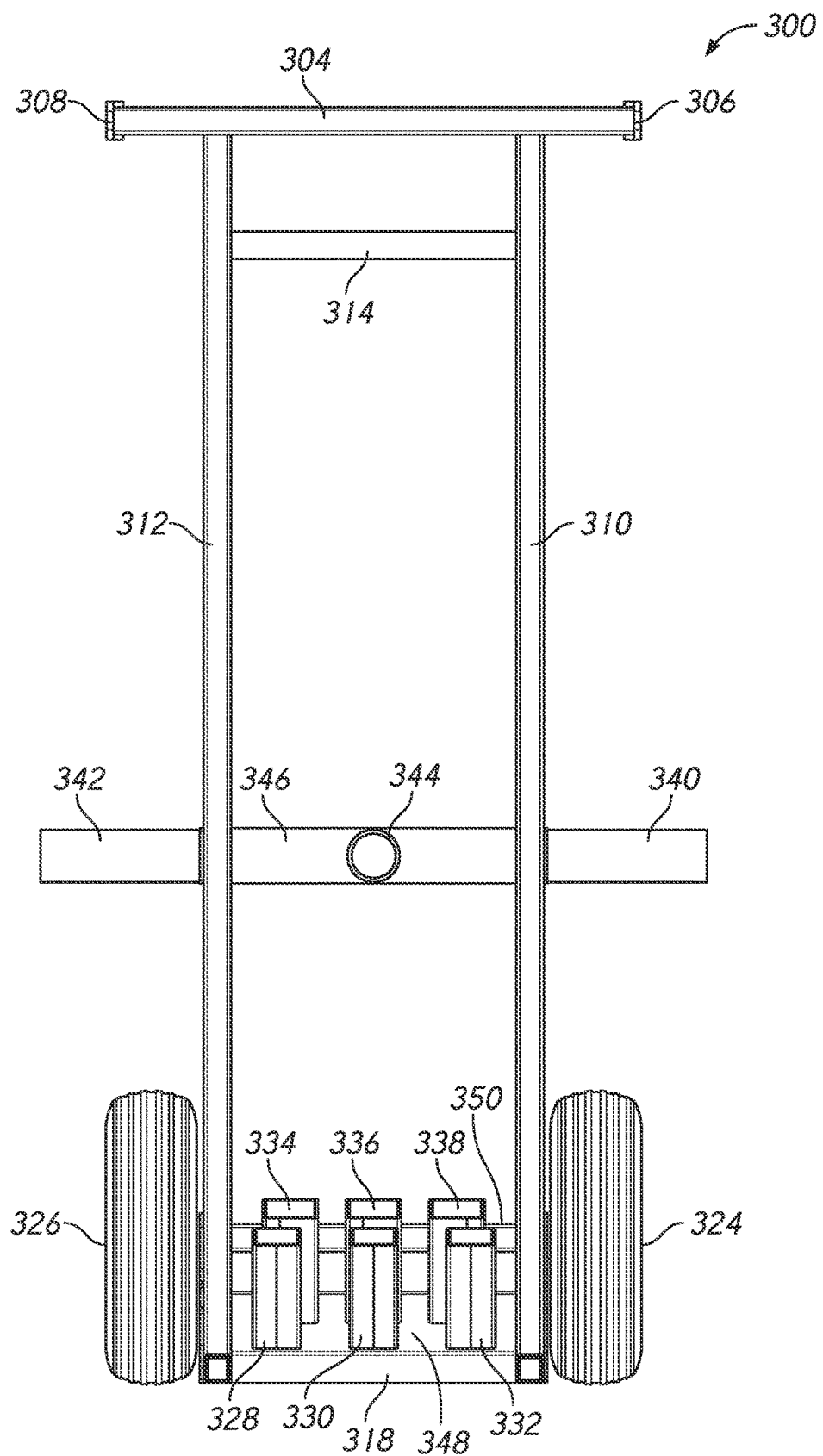
FIG. 3C is a front view of the cart.
Figure 3D:
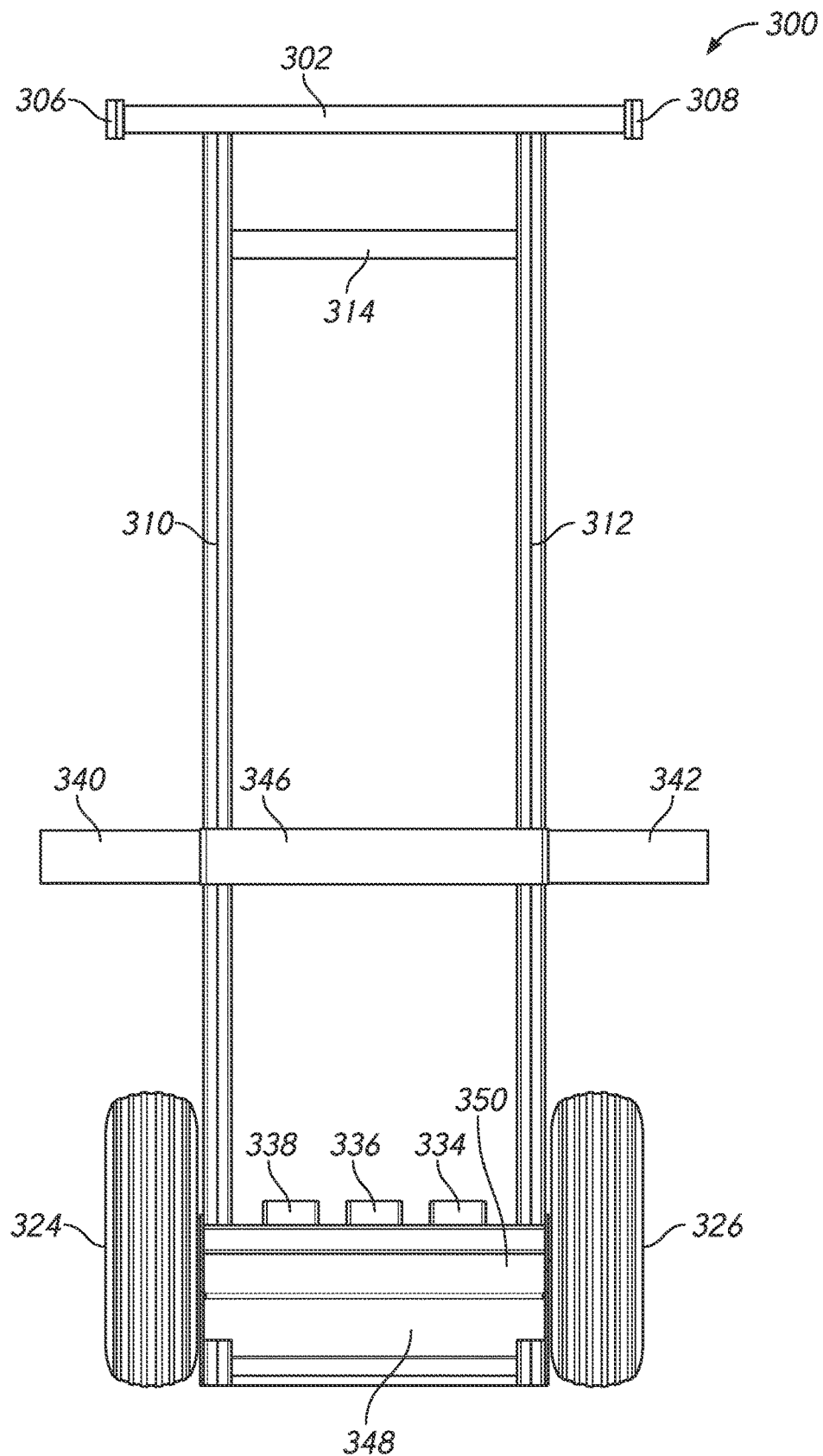
FIG. 3D is a back view of the cart.
Figure 3E:
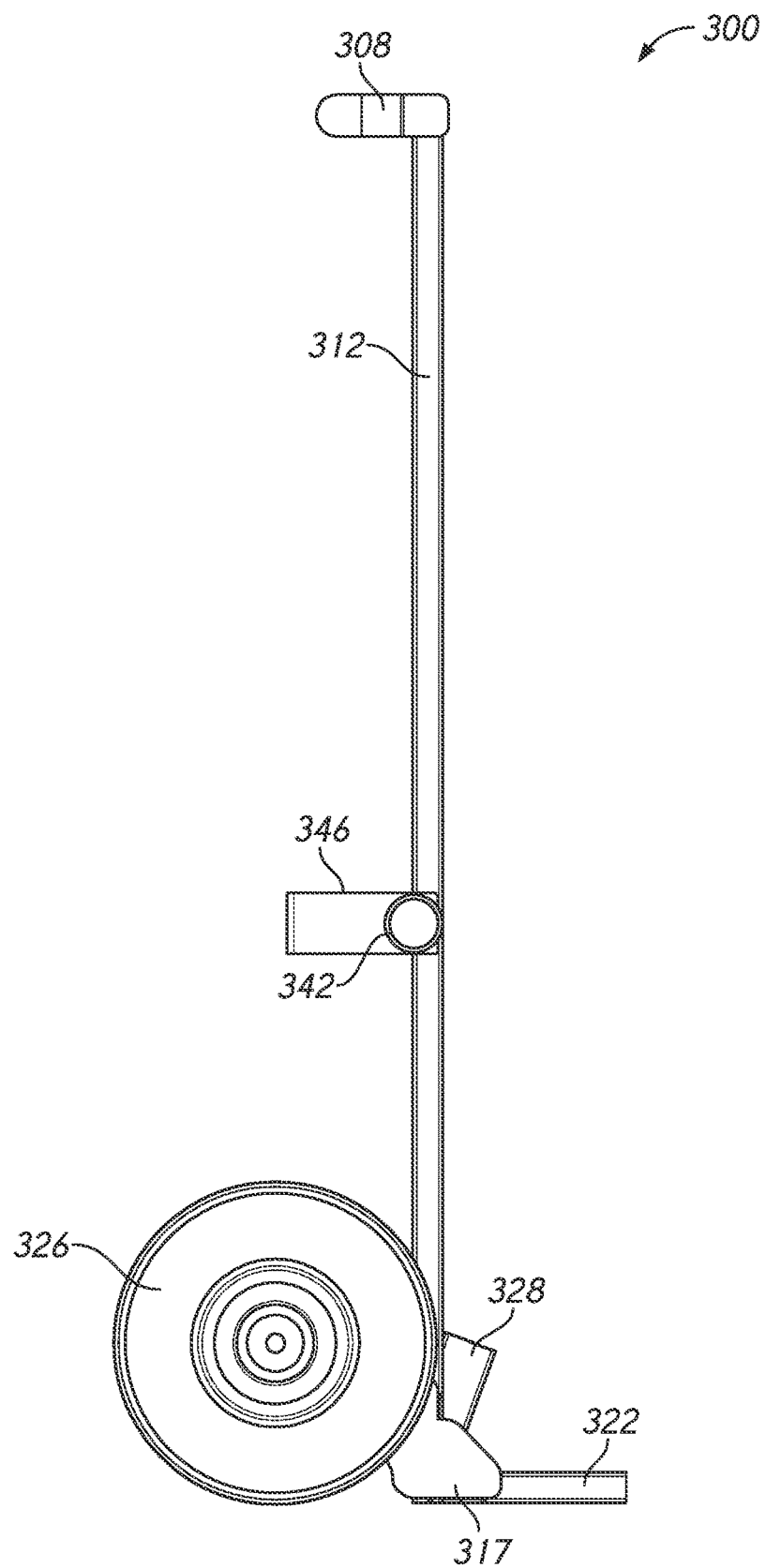
FIG. 3E is a side view of the cart.
Figure 3F:
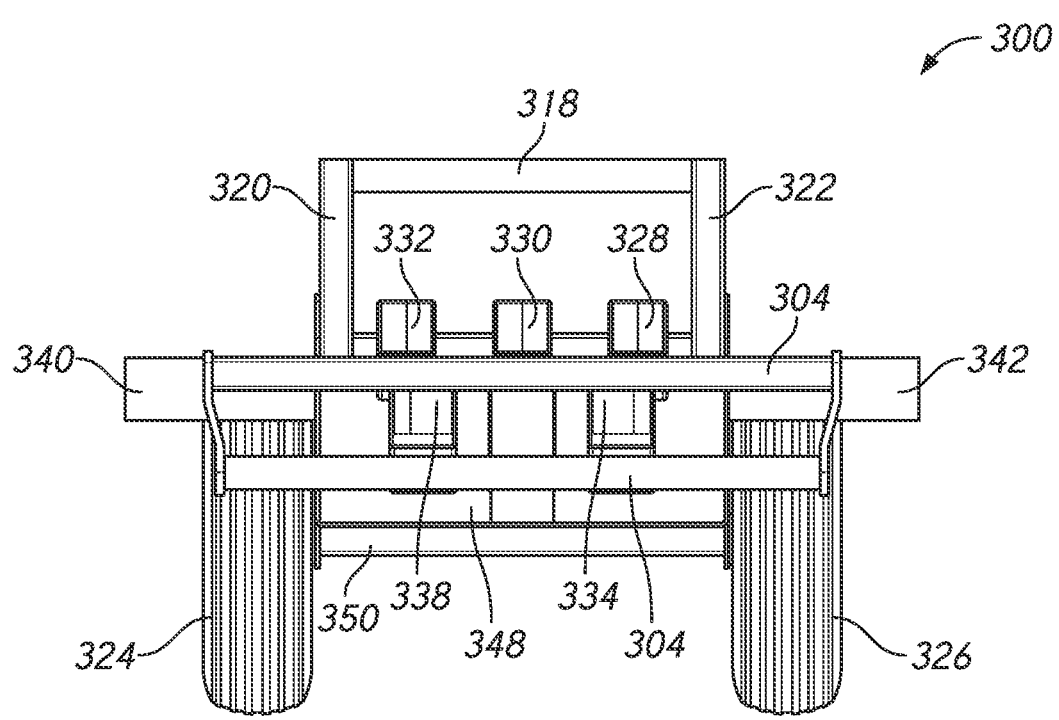
FIG. 3F is a top view of the cart.

FIG. 3A illustrates a user 102 using an example cart 300, also referred to as hand truck or truck 300, to transport harness 100, disassembled rack 200, and weights 104. The harness 100, rack 200, and cart 300 provide a portable gym that can be used in a variety of settings. The harness 100, rack 200, and cart 300 can fit conveniently into a standard SUV, pickup truck, and/or select car trunks. Cart 300, even with harness 100 and rack 200 mounted, can maneuver uneven surfaces, curbs, up/down hills, through standard doorways, etc.

FIGS. 3B-3F illustrate various views of an example cart 300. Cart 300 can have a handle 302 configured to be grasped by a user and used to negotiate cart 300. In some embodiments, handle 302 can have a circular cross-section for user comfort. In some embodiments, handle 302 is circular tubing.

Harness support 304 can interface with storage/racking hooks 136, 138 to transport harness 100. Harness support 304 can be offset and parallel to handle 302. Connectors 308, 306 can extend between harness support 304 and handle 302 to facilitate an offset configuration.

Upright supports 310, 312 can be coupled to harness support 304 and extend in a direction that is perpendicular to the longitudinal direction of harness support 304. Upright supports 310, 312 can provide stability and height to accommodate a variety of users. The ends of upright supports 310, 312 opposite the harness support 304 can be coupled to a base plate 348. Cross upright support 314 can extend between uprights supports 310, 312 and be located generally proximate an end portion of upright supports 310, 312 that is coupled to harness support 304. In some embodiments, cross upright support 314 can have a circular cross-section. In some embodiments, cross upright support 314 can be a handle to be grasped by a user.

Bracket 346 can be coupled to upright supports 310, 312. Bracket 346 can be U-shaped as viewed from above. Weight storage mounts 340, 342, and 344 can be coupled to bracket 346. Weight storage mounts 340, 342, and 344 can be cylindrical. Weight storage mounts 340, 342, and 344 can interface with the center holes of weights for transportation and/or storage. In some embodiments, weight storage mounts 340, 342 extend outwardly from cart 300 in opposing directions that are transverse to the longitudinal direction of uprights supports 310, 312. In some embodiments, weight storage mount 344 extends in a forward direction relative to cart 300 and is positioned on bracket 346 between upright supports 310, 312. In some embodiments, weight storage mounts 340, 342, and 344 can support weights, including barbell/bumper plates/weights (small and large) weighing about 400 pounds, securely while at rest and while negotiating cart 300. In some embodiments, weight storage mounts 340, 342, and 344 can support greater than or equal to 100, 200, 300, 400, 500, 600, 700, 800, 900, and/or 1000 pounds. In some embodiments, the cart 300 can be configured to store/transport kettlebells, dumbbells, and/or a variety of weightlifting bars (straight, trap, curl, etc.). In some embodiments, weight storage mounts 340, 342, and 344 can have a different diameters to accommodate a variety of center hole diameters of weights/plates.

Base plate 348 can have a plurality of connecting supports, which can include connecting supports 328, 330, 332, 334, 336, 338, that are configured to interface with the dissembled supports of rack 200 such that the dissembled rack 200 can be transported by cart 300, as shown in FIG. 3A. In some embodiments, the plurality of connecting supports are sized to securely connect with supports of rack 200, e.g., fit within the cavities of supports of rack 200 or vice-versa. In some embodiments, the disassembled supports of rack 200 extend perpendicularly from the base plate 348 when interfacing with the plurality of connecting supports. In some embodiments, specific supports of rack 200 must interface, or preferably interface, with specific connecting supports of cart 300. In some embodiments, color and/or numeric markings on connecting supports of cart 300 and supports of rack 200 indicate necessary or preferable coupling arrangements for transportation.

Standing supports 316, 317 can extend from base plate 348 in a forward direction. In some embodiments, standing supports 316, 317 can be coupled to standing supports 320, 322. Cross standing support 318 can extend between standing supports 320, 322 at a position that is proximate the ends of standing supports 320, 322 that is opposite base plate 348. Standing supports 316, 317 and cross standing support 318 can provide a safe base of support to prevent cart 300 from falling over when resting. Cross standing support 318 can add rigidity to standing supports 316, 317. In some embodiments, cross standing support 318 can be a handle for maneuvering cart 300, which can include loading and unloading cart 300 from a vehicle. In some embodiments, cross standing support 318 has a circular cross-section.

In some embodiments, base plate 348 can be positioned at an angle relative to the ground when cart 300 is in a resting position. This can allow for connecting supports 328, 330, and 332 to be positioned at different heights than connecting supports 334, 336, 338 when cart 300 is in a resting position.

Side supports 316, 317 can be positioned on a side surface of base plate 348 and standing supports 320, 322. Side supports 316, 317 can add rigidity and support to cart 300.

An end of base plate 348 opposite standing supports 320, 322 can have a support wall 350. In some embodiments, support wall 350 can house an axle that extends between wheels 322, 324. In some embodiments, a user can place the user's foot on the support wall 350 to assist in placing the cart 300 in a resting position. Wheels 324, 326 can be positioned on opposing sides of support wall 350 and/or base plate 348. Wheels 324, 326 can be heavy duty such that wheels 324, 326 can easily traverse over uneven surfaces and support a desirable load. In some embodiments, the wheels 324, 326 can support greater than or equal to 400 pounds. In some embodiments, the wheels 324, 326 can support greater than or equal to 100, 200, 300, 400, 500, 600, 700, 800, 900, and/or 1000 pounds.

In some embodiments, the cart 300, loaded with the harness 100 and rack 200, for transport/storage in the upright position can have a length of approximately 30 inches, width of approximately 24 inches, and height of approximately 64 inches. This can allow the cart 300, loaded with the harness 100 and rack 200, to be maneuvered through standard doorways. In some embodiments, the harness 100, rack 200, and cart 300 can be stored/transported, while the various components are lying flat, within an area having a height of at least approximately 16 inches, width of at least approximately 24 inches, and length of at least approximately 64 inches, such that the system is configured to be conveniently stored and/or transported in standard SUVs, pickup trucks, and/or select car trunks. In some embodiments, the harness 100 can be transported/stored in an area having a length of at least approximately 24 inches, width of at least approximately 18 inches, and height of at least approximately 12 inches. In some embodiments, the rack 200 can be transported/stored in an area having a length of at least approximately 64 inches, width of at least approximately 8 inches, and height of at least approximately 8 inches. In some embodiments, the cart 300 can be transported stored in an area having a length of at least approximately 45 inches, width of at least approximately 24 inches, and height of at least approximately 12 inches. All dimensions listed are examples. The devices and systems disclosed herein can have dimensions that are larger or smaller than those explicitly stated.

The features, elements, and components described herein can be made of a variety of durable materials, including metals (such as steel, aluminum, etc.), metal alloys, polymers, ceramics, and/or other suitable materials.

The supports and/or components described herein can have cross-sections that are different shapes, such as square, circle, polygonal, and or other suitable shapes. In some embodiments, the supports and/or components described herein are hollow, having cavities. In some embodiments, standard tubes and/or bars, such as square tubes, are used to make the supports and/or components described herein to reduce manufacturing complexity and cost.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A resistive exercise harness system, the system comprising:
   an exercise harness, wherein the exercise harness comprises an upper portion and a lower portion,
      wherein the upper portion comprises shoulder supports, forwardly-extending grip handles, and upper back supports; and
      wherein the lower portion comprises a mid/low back support, and weight mounts;
   a rack, wherein the rack is configured to be assembled and disassembled, and wherein the exercise harness is configured to mount and unmount onto the rack; and
   a cart, wherein the cart is configured to transport the resistive exercise harness and disassembled rack, wherein the cart comprises a harness support, wheels, and connecting supports, wherein the harness support is configured to support the harness, wherein the connecting supports are configured to interface with the disassembled rack, and wherein the cart comprises a plurality of weight storage mounts that are configured to interface with weights.

2. The resistive exercise harness system of claim 1, wherein the rack comprises an upper cross support, wherein the exercise harness is configured to mount and unmount onto the upper cross support, and wherein the upper cross support is adjustable to different positions to accommodate a user's preferences and size.

3. The resistive exercise harness system of claim 1, wherein the rack comprises bottom supports, upright supports, and an upper cross support, and wherein the bottom supports, upright supports, and upper cross support are configured to couple together to form the rack.

4. The resistive exercise harness system of claim 3, wherein the upright supports comprise weight storage mounts that are configured to interface with weights that are not in use.

5. The resistive exercise harness system of claim 1, wherein the lower portion of the resistive exercise harness is adjustable relative to the upper portion such that the mid/low back support is configured to be adjusted to various positions to accommodate a user's preferences and/or sizes.

6. The resistive exercise harness system of claim 1, wherein the system is configured to be stored within an area having a height of at least 16 inches, width of at least 24 inches, and length of at least 64 inches, such that the system is configured to be conveniently stored and/or transported in standard SUVs, pickup trucks, and/or select car trunks.

7. A resistive exercise harness, the harness comprising:
   an upper portion;
   a lower portion;
   wherein the upper portion comprises:
      shoulder supports configured to engage with shoulders of a user, wherein the shoulder supports comprise pads,
      forwardly-extending grip handles coupled to the shoulder supports, wherein the grip handles are configured to be grasped by the user,
      upper back supports configured to engage with an upper back of the user, wherein the upper back supports comprise pads,
      storage/racking hooks configured to interface with at least a cross support bar of a weight rack for mounting and unmounting the harness, and
      transporting/spotting grips configured to be used for transporting the harness and/or spotting a user during exercises;
   wherein the lower portion comprises:
      a mid/low back support configured to engage with a mid or lower back of the user, wherein the mid/low back support comprises at least one pad, and
      mounts, wherein the mounts extend outwardly and rearwardly from the lower portion at an angle between 30-60 degrees, and wherein the mounts are configured to interface with weights.

8. A resistive exercise harness, the harness comprising:
   an upper portion;
   a lower portion;
   wherein the upper portion comprises:
      shoulder supports configured to engage with shoulders of a user,
      forwardly-extending grip handles configured to be grasped by the user, and
      upper back supports configured to engage with an upper back of the user;
   wherein the lower portion comprises:
      a mid/low back support configured to engage with a mid or lower back of the user, and
      mounts configured to interface with weights;
      wherein the lower portion is adjustable relative to the upper portion such that the mid/low back support is configured to be adjusted to various positions to accommodate user's preferences and/or sizes.

9. The resistive exercise harness of claim 8, wherein the grip handles comprise distal ends having an enlarged size relative to the grip handles that are configured to help prevent a user's hand from slipping off the grip handles.

10. The resistive exercise harness of claim 9, wherein the distal ends of the grip handles comprise spheres.

11. The resistive exercise harness of claim 8, wherein the upper portion comprises a locking hole and the lower portion comprises a plurality of adjustment holes, wherein one of the plurality of adjustment holes is configured to be selectively aligned with the locking hole to place the lower portion in a desired position relative to the upper portion, and wherein a locking mechanism is configured to interface with the locking hole and adjustment holes to fix the lower portion to the upper portion in the desired position.

12. The restive exercise harness of claim 8, wherein the upper portion and lower portion form an inverted L-shape when viewed from the side.

13. The resistive exercise harness of claim 8, wherein the mounts extend outwardly and rearwardly from the lower portion of the harness.

14. The resistive exercise harness of claim 8, wherein the upper portion comprises a plurality of storage/racking hooks extending rearwardly from the upper portion, wherein the plurality of storage/racking hooks are configured to interface with at least a cross support bar of a weight rack for mounting and unmounting the harness.

15. The resistive exercise harness of claim 8, wherein the upper portion comprises a plurality of transporting/spotting grips that are configured to be used for transporting the harness and/or spotting a user during exercises.

16. The resistive exercise harness of claim 8, wherein the shoulder supports, upper back supports, and/or mid/low back supports comprise pads, wherein the pads are configured to provide cushioning.

17. The resistive exercise harness of claim 8, wherein the shoulder supports, upper back supports, and mid/low back support are made of square tubing.

* * * * *